United States Patent
Enan

(10) Patent No.: US 11,882,839 B2
(45) Date of Patent: Jan. 30, 2024

(54) ENHANCED FORMULATIONS, COMPOSITIONS AND METHODS FOR PEST CONTROL

(71) Applicant: TyraTech, Inc., Morrisvillle, NC (US)

(72) Inventor: Essam Enan, Davis, CA (US)

(73) Assignee: TYRATECH, INC., Morrisville, NC (US)

( * ) Notice: Subject to any disclaimer, the term of this patent is extended or adjusted under 35 U.S.C. 154(b) by 0 days.

(21) Appl. No.: 17/557,135

(22) Filed: Dec. 21, 2021

(65) Prior Publication Data

US 2022/0338482 A1 Oct. 27, 2022

Related U.S. Application Data

(63) Continuation of application No. 16/051,875, filed on Aug. 1, 2018, now Pat. No. 11,241,008, which is a continuation of application No. 14/534,046, filed on Nov. 5, 2014, now abandoned, which is a continuation of application No. 13/260,099, filed as application No. PCT/US2010/029103 on Mar. 29, 2010, now abandoned.

(60) Provisional application No. 61/211,428, filed on Mar. 28, 2009.

(51) Int. Cl.
| | | |
|---|---|---|
| A01N 65/00 | (2009.01) | |
| A01N 61/00 | (2006.01) | |
| A01N 65/22 | (2009.01) | |
| A01N 31/02 | (2006.01) | |
| A01N 35/04 | (2006.01) | |
| A01N 37/02 | (2006.01) | |

(52) U.S. Cl.
CPC ............. *A01N 65/00* (2013.01); *A01N 31/02* (2013.01); *A01N 35/04* (2013.01); *A01N 37/02* (2013.01); *A01N 61/00* (2013.01); *A01N 65/22* (2013.01); *Y02A 50/30* (2018.01)

(58) Field of Classification Search
CPC ...................................................... A01N 65/00
See application file for complete search history.

(56) References Cited

U.S. PATENT DOCUMENTS

| | | | |
|---|---|---|---|
| 5,443,835 | A | 8/1995 | Winston |
| 5,736,584 | A | 4/1998 | Kunkel |
| 5,827,522 | A | 10/1998 | Nowak |
| 6,004,569 | A | 12/1999 | Bessette |
| 6,676,955 | B2 | 1/2004 | Kensek |
| 6,887,899 | B1 | 5/2005 | Bessette |
| 7,541,155 | B2 | 6/2009 | Enan |
| 7,622,269 | B2 | 11/2009 | Enan |
| 8,293,286 | B2 | 10/2012 | Nouvel |
| 8,501,247 | B2 | 8/2013 | Enan et al. |
| 8,507,013 | B2 | 8/2013 | Enan |
| 8,685,471 | B2 | 4/2014 | Enan |
| 8,691,256 | B2 | 4/2014 | Enan |
| 8,734,869 | B2 | 5/2014 | Enan |
| 8,865,230 | B2 | 10/2014 | Enan |
| 8,999,407 | B2 | 4/2015 | Salomon et al. |
| 9,492,490 | B1 | 11/2016 | Enan |
| 10,149,481 | B2 | 12/2018 | Bissinger et al. |
| 10,368,543 | B2 | 8/2019 | Enan |
| 10,595,529 | B1 | 3/2020 | Enan |
| 11,241,008 | B2 | 2/2022 | Enan |
| 2002/0107287 | A1 | 8/2002 | Bessette |
| 2003/0026823 | A1 | 2/2003 | Fried et al. |
| 2003/0175369 | A1 | 9/2003 | Khazan-Enache |
| 2006/0263403 | A1 | 11/2006 | Enan |
| 2007/0190094 | A1 | 8/2007 | Bessette |
| 2008/0038304 | A1 | 2/2008 | Nouvel |
| 2008/0047312 | A1 | 2/2008 | Hill et al. |
| 2008/0075796 | A1 | 3/2008 | Enan |
| 2008/0145462 | A1 | 6/2008 | Enan |
| 2009/0099135 | A1 | 4/2009 | Enan |
| 2009/0232918 | A1 | 9/2009 | Enan |
| 2010/0196520 | A1 | 8/2010 | Elraz |
| 2011/0003317 | A1 | 1/2011 | Enan |
| 2011/0008471 | A1 | 1/2011 | Enan |
| 2011/0070322 | A1 | 3/2011 | Bessette et al. |
| 2011/0171135 | A1 | 7/2011 | Enan |
| 2013/0164361 | A1 | 6/2013 | Enan |
| 2014/0377385 | A1 | 12/2014 | Enan |
| 2015/0087516 | A1 | 3/2015 | Enan |
| 2015/0150838 | A1 | 6/2015 | Enan et al. |
| 2015/0201615 | A1 | 7/2015 | Schmidt et al. |
| 2016/0029625 | A1 | 2/2016 | Kennedy et al. |
| 2017/0023123 | A1 | 8/2017 | Enan |
| 2017/0318806 | A1 | 11/2017 | Kennedy et al. |
| 2018/0035674 | A1 | 2/2018 | Schmidt et al. |
| 2019/0015376 | A1 | 1/2019 | Enan et al. |
| 2019/0274312 | A1 | 9/2019 | Bissinger et al. |
| 2019/0320653 | A1 | 10/2019 | Enan |

(Continued)

FOREIGN PATENT DOCUMENTS

| | | |
|---|---|---|
| EP | 1488697 A1 | 12/2004 |
| JP | 2002-521406 | 7/2002 |

(Continued)

OTHER PUBLICATIONS

U.S. Appl. No. 15/878,940, filed Jan. 24, 2018.

*Primary Examiner* — Sarah Alawadi
(74) *Attorney, Agent, or Firm* — K&L Gates LLP

(57) ABSTRACT

Formulations of pesticides are disclosed, specifically pesticidal blends of essential oils and other ingredients, that have been found to enhance the activity of the active pesticidal ingredients. The formulations may be, for example, emulsions or dust formulations. For example, a composition for controlling a target pest is disclosed that comprises at least one active agent and a formulation agent, wherein: the active agent is capable of interacting with a receptor in the target pest; the active agent has a first activity against the target pest when applied without the formulation agent and the composition has a second activity against the target pest; and the second activity is greater than the first activity.

9 Claims, 2 Drawing Sheets

(56) References Cited

U.S. PATENT DOCUMENTS

2020/0329716 A1 10/2020 Enan
2022/0053760 A1 2/2022 Enan
2022/0232826 A1 7/2022 Enan

FOREIGN PATENT DOCUMENTS

WO    WO 2009/117621 A1    9/2009
WO    WO 2014/063109 A1    4/2014

ENHANCED FORMULATIONS, COMPOSITIONS AND METHODS FOR PEST CONTROL

RELATED APPLICATIONS

This application claims the benefit of U.S. Provisional Patent Application No. 61/211,428, filed Mar. 28, 2009, the entire text whereof is incorporated by reference into the present application.

FIELD OF THE INVENTION

The present invention relates to compositions and methods related to controlling pests.

BACKGROUND

While the first recorded use of chemicals to control pests dates back to 2500 BC, only in the last 60 years has chemical control has been widely used. Early pesticides included hellebore to control body lice, nicotine to control aphids, and pyrethrin to control a wide variety of insects. Lead arsenate was first used in 1892 as an orchard spray, while at the same time it was discovered that a mixture of lime and copper sulphate (Bordeaux mixture) controlled downy mildew, a fungal disease of grapes. Many of the more recent pesticides have been developed to target specific biochemical reactions within the target organism, e.g. an enzyme necessary for photosynthesis within a plant or a hormone required for normal development in an insect.

Recently, there has been increased research into the deleterious effects of chemical pesticides, with concomitant efforts to develop safer alternatives to current commercial pesticides. Some of this research has focused on the use of natural products, such as combinations of chemicals obtained from plants, such as essential oils.

In general, synthetic chemical pesticides and natural pesticides are applied in particular formulations that facilitate their use against pests in the field. For example, hydrophobic pesticidal compounds, such as essential oils, have been used in formulations, such as emulsions, that permitted admixture with water to form a spray. However, in general, these formulations have simply been employed to facilitate application of the pesticide directly to the pests or to the surfaces or environments inhabited by the pests.

Microemulsions are clear uniform liquid mixtures of oil, water and surfactant. In part, because its surfactant component is a wetting agent that lowers the surface tension of liquid, microemulsions tend to consist of a mixture that can be spread easier than other mixtures and thus provide greater surface area. Perhaps for this reason, considerable attention has been directed toward microemulsion-based pesticidal formulations. Although the formulation of microemulsions is far from being an exact science, as many oil based pesticides are not able to microemulsify and the interactions between oil, emulsifiers and water molecules are still not completely understood, microemulsion formulations appear to be an emerging standard for the formulation of hydrophobic pesticides in water-based carriers.

Efforts to improve the activity of pesticides have been mainly directed toward discovering new compounds that may act as active ingredients of the pesticide. Heretofore, attention has not been focused on the optimization of formulations specifically as a route to improve the activity of the active pesticidal ingredients in the formulations.

BRIEF DESCRIPTION OF THE FIGURES

Exemplary embodiments are illustrated in referenced figures. It is intended that the embodiments and figures disclosed herein are to be considered illustrative rather than restrictive.

DESCRIPTION OF THE INVENTION

Figure 1:
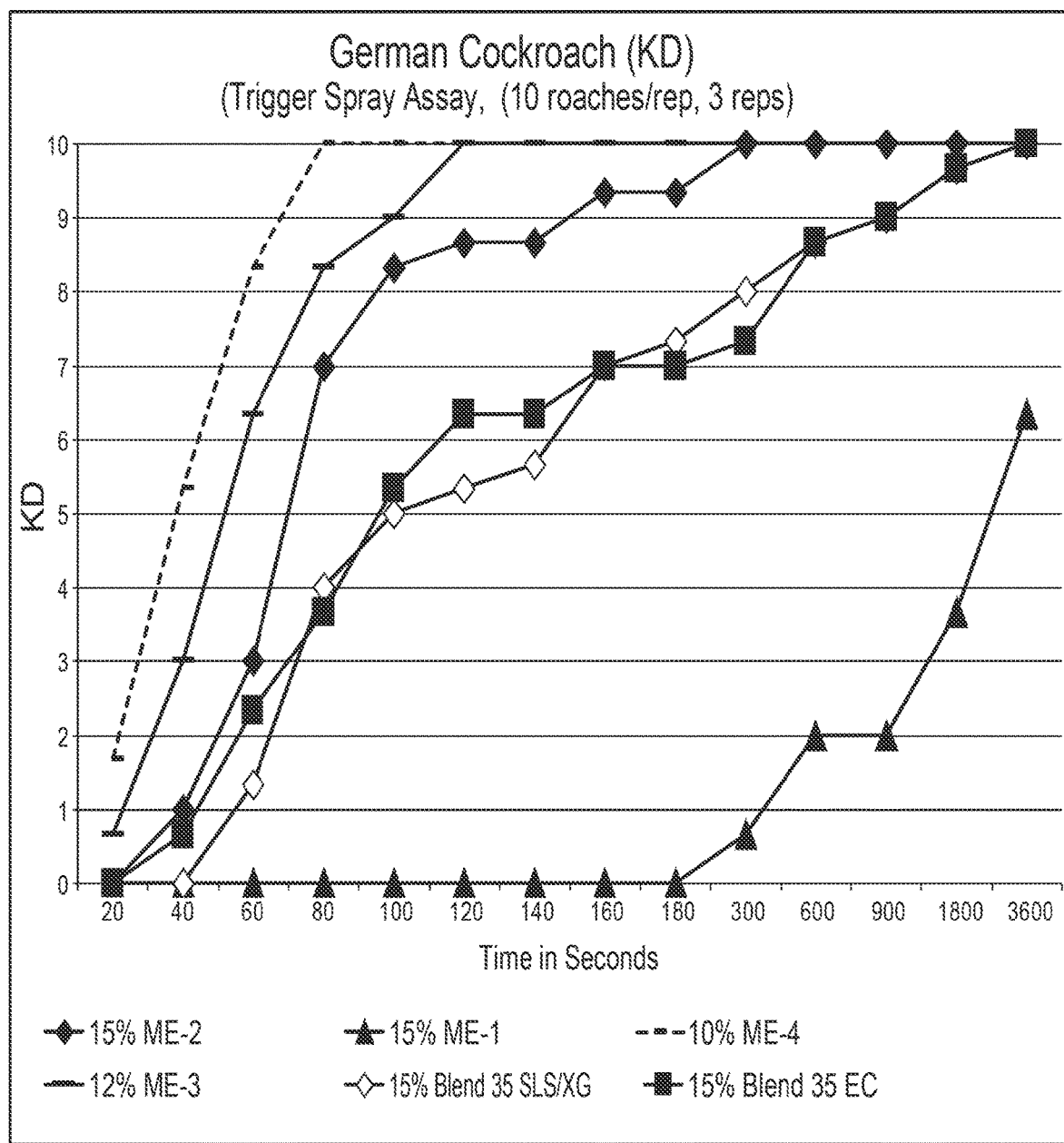
FIG. 1 depicts, in accordance with an embodiment described herein, a chart of percent of insects knocked down by of formulations of a blend containing the ingredients in the exemplified form of Ingredient Family 24 applied to the German cockroach.

The present disclosure relates to emulsion-based formulations of pesticides, specifically pesticidal blends of essential oils and other ingredients, that have been found to enhance the activity of the active pesticidal ingredients. Surprisingly, by preparing the pesticide as an emulsion formulation, the activity of an ingredient may be greatly enhanced and the efficacy of the pesticide may be vastly improved. In addition to increasing the overall potential potency of the pesticide, enhancing the activity of a key ingredient can also be helpful in reducing the amount of active ingredients that may be required for effective pest control. This, in turn, improves the overall safety of the pesticide and may increase the likelihood of a pesticide receiving EPA approval when it becomes developed for commercial application.

In addition, the present disclosure relates to a dust formulation that also improves the activity of pesticidal blends that are formulated in this manner. Such dust formulations are employed in hard-to-reach areas that are not amenable to the application of liquid sprays. Commercially available dust formulations include DeltaDust and Drione®. As with the emulsion-based formulations of pesticides, these formulations themselves have not been not known to specifically enhance the activity of the active ingredients in the dust formulations.

Embodiments of the invention are directed to compositions for controlling insects and methods for using these compositions. Embodiments of the invention include compositions for controlling pests, which can include one or more plant essential oils and methods for using these compositions. The plant essential oils, when combined, can have a synergistic effect. The compositions also can include a fixed oil, which is typically a non-volatile non-scented plant oil. Additionally, in some embodiments, these compositions can be made up of generally regarded as safe (GRAS) compounds.

For purposes of simplicity, the term "pest" shall be used in this application. However, it should be understood that the term "pest" that encompasses a variety of life forms such as various types of animals including worms and insects, fungi, plants, protists, and monerans. As used in this application the term "insect" refers, not only to insects, but also tomites, spiders, and other arachnids, larvae, and like invertebrates. Also for purposes of this application, the term "pest control" shall refer to having a repellant effect, a pesticidal effect, or both. "Repellant effect" is an effect wherein more pests are repelled away from a host or area that has been treated with the composition than a control host or area that has not been treated with the composition.

"Pesticidal effect" is an effect wherein treatment with a composition causes at least about 1% of the pests to die. In this regard, an LC1 to LC100 (lethal concentration) or an LD1 to LD100 (lethal dose) of a composition will cause a pesticidal effect. In some embodiments, the pesticidal effect is an effect wherein treatment with a composition causes at least about 5% of the exposed pests to die.

In some embodiments, the pesticidal effect is an effect wherein treatment with a composition causes at least about 10% of the exposed pests to die. In some embodiments, the pesticidal effect is an effect wherein treatment with a composition causes at least about 25% of the pests to die. In some embodiments the pesticidal effect is an effect wherein treatment with a composition causes at least about 50% of the exposed pests to die. In some embodiments the pesticidal effect is an effect wherein treatment with a composition causes at least about 75% of the exposed pests to die. In some embodiments the pesticidal effect is an effect wherein treatment with a composition causes at least about 90% of the exposed pests to die.

As used herein, the term "bioassay," refers to a quantitative procedure used to determine the relationship between amount (or dose or concentration) of pesticide administered and the magnitude of response in the living organism.

As used herein, the term "KD" refers to knockdown. "Knockdown" is an effect wherein treatment with a composition causes at least about 1% to display reduced mobility. In some embodiments, the knockdown is an effect wherein treatment with a composition causes at least about 50% of the exposed pests to die.

As used herein, the term "$KT_{50}$" means the knockdown time of 50% of a given population or strain. Similarly, the term "$KT_{95}$" means the knockdown time of 95% of a given population or strain.

As used herein, the term "C.I." means confidence interval.

As used herein, the term "Percent Control" refers to a percentage out of 100%.

As used herein, the term "A.I." means active ingredient.

As used herein, the term "RTU" means Ready-To-Use sprayer.

As used herein and know to one of skill in the art, the spectrum of various types of emulsions in terms of both water out and oil out, as well as size distribution of the emulsion are incorporated in the term "emulsions," including microemulsions. Nevertheless, in particular embodiments of the present invention the formulation agents are not such as to form a microemulsion. Embodiments encompassing all or some formulations other than microemulsions are specifically contemplated.

As used herein, "repellant effect" is an effect wherein more pests are repelled away from a host or area that has been treated with the composition than a control host or area that has not been treated with the composition.

As used herein, "component of a composition" refers to a compound, or a subset of compounds included in a composition, e.g., the complete composition minus at least one compound.

As disclosed herein, molecular components required for pest behavior and survival were identified, offering molecular targets for the development of pesticides. Although many of the blends described herein were originally developed against insects, they have been found to have surprising antifungal, herbicidal and other properties against other genera of pests in addition to insects. These effects are enhanced by the formulations Embodiments of the invention are directed to compositions for controlling pests and methods for preparing and using these compositions. Compositions of the present invention can include any of the following oils, formulations, chemicals, compounds, or mixtures thereof:

Isopropyl myristate. Isopropyl myristate, also known as methylethyl ester or myristic acid isopropyl ester, is an ester of isopropanol and myristatc acid.

Wintergreen oil is oil from the shrub genus *Gaultheria*. Methyl salicylate, the main constituent of the oil, is not present in the plant until formed by enzymatic action from a glycoside within the leaves.

Thyme oil. Thyme oil is a natural product that can be extracted from certain plants, including species from the Labiatae family; for example, thyme oil can be obtained from *Thymus vulgaris* (also known as, *T. ilerdensis, T. aestivus,* and *T. velantianus*).

Geraniol. Geraniol, also called rhodinol, is a monoterpenoid and an alcohol. It is the primary part of oil-of-rose and palmarosa oil. It is used in perfumes and as a flavoring. It is also produced by the scent glands of honey bees to help them mark nectar-bearing flowers and locate the entrances to their hives. In certain embodiments, where geraniol is employed, it may be mixed with 10%, 20%, 30%, or 40% or more nerol. Commercially obtained geraniol may be designated by the amount of geraniol it contains. For example, a 60/40 mixture of geraniol is termed "geraniol 60."

In one embodiment, the present invention provides a pest control composition comprising an active ingredient and an inert ingredient. In another embodiment, the active ingredient includes Blend 11, Blend 35 and/or Blend 38 (Table 1 herein). In another embodiment, the active ingredient includes isopropyl myristatc, wintergreen oil, geraniol and/or thyme oil. In another embodiment, expressed as percentage by weight, the insect control composition is a compound that includes 30-40% isopropyl myristate, 40-50% wintergreen oil, and/or 15-25% thyme oil. In another embodiment, expressed as percentage by weight, the active ingredient is a compound that includes 30-55% isopropyl myristate, 10-40% geraniol, and/or 25-40% thyme oil. In another embodiment, the insect control composition includes 48.35% isopropyl myristate, 14.98% geraniol fine FCC, and/or 36.67% thyme oil. In another embodiment, the insect control composition includes 38.650% isopropyl myristate, 29.940% geraniol fine FCC, and/or 31.410% thyme oil.

In one embodiment, the inert ingredient may serve to enhance the effectiveness of the active ingredient as a pest control. In another embodiment, the inert ingredient enhances the effectiveness of the active ingredient as a pest control agent by increasing the surface area of the active ingredient. In another embodiment, the inert ingredient is an emulsion formulation. In another embodiment, the inert ingredient is a microemulsion. In another embodiment, the inert ingredient is an SLS/xanthan gum formulation, and/or an EC formulation. In another embodiment, the EC formulation is a Castor Oil Ethoxylate and Tween 80 formulation.

While embodiments of the invention can include active ingredients, carriers, inert ingredients, and other formulation components, preferred embodiments begin with a primary blend. A primary blend is preferably a synergistic combination containing two or more active ingredients and, optionally, additional ingredients. The primary blends can then be combined with other ingredients to produce a formulation. Accordingly, where concentrations, concentration ranges, or amounts, are given herein, such quantities typically are in reference to a primary blend or blends. Thus, when a primary blend is further modified by addition of other ingredients to produce a formulation, the concentrations of the active ingredients are reduced proportional to the presence of other ingredients in the formulation.

In another embodiment, the present invention provides a method of controlling pests by administering compounds of the present invention described herein. The compositions of the present invention can be used to control pests by either treating a host directly, or treating an area in which the host will be located. For example, the host can be treated directly by using a cream or spray formulation, which can be applied externally or topically, e.g., to the skin of a human. A composition can be applied to the host, for example, in the case of a human, using formulations of a variety of personal products or cosmetics for use on the skin or hair. For example, any of the following can be used: fragrances, colorants, pigments, dyes, colognes, skin creams, skin lotions, deodorants, talcs, bath oils, soaps, shampoos, hair conditioners and styling agents.

In the case of an animal, human or non-human, the host can also be treated directly by using a formulation of a composition that is delivered orally. For example, a composition can be enclosed within a liquid capsule and ingested.

An area can be treated with a composition of the present invention, for example, by using a spray formulation, such as an aerosol or a pump spray, or a burning formulation, such as a candle or a piece of incense containing the composition. Of course, various treatment methods can be used without departing from the spirit and scope of the present invention. For example, compositions can be comprised in household products such as: air fresheners (including heated air fresheners in which insect repellent substances are released upon heating, e.g., electrically, or by burning); hard surface cleaners; or laundry products (e.g., laundry detergent-containing compositions, conditioners).

In some embodiments, repellant effect is an effect wherein at least about 75% of pests are repelled away from a host or area that has been treated with the composition. In some embodiments, repellant effect is an effect wherein at least about 90% of pests are repelled away from a host or area that has been treated with the composition.

In another embodiment, the present invention provides a method of preparing a pesticide by combining one or more of the compounds and/or formulations described herein. By blending certain compounds and/or formulations in certain relative amounts, the resulting composition demonstrates a repellant or pesticidal effect that exceeds the repellant or pesticidal effect of any component of the composition. In another embodiment, the formulation is an emulsion. In another embodiment, the formulation is a microemulsion. In another embodiment, the formulation is a dust formulation.

In another embodiment, the present invention provides a method of preparing a formulated sprayable product by combining an active ingredient and an inert ingredient. For example, the active ingredient may be, as described herein, Blend 11, Blend 35 and/or Blend 38. Or, for example, the inert ingredient may be an emulsion formulation, microemulsion formulation, SLS/Xanthan Gum formulation, EC formulation, or dust formulation. In another embodiment, the EC formulation is a Castor Oil Ethoxylate and Tween 80 formulation.

Further discussion of various approaches to screening, preparing, evaluating, and using insect control formulations are also disclosed in the following applications, each of which is incorporated by reference in its entirety: U.S. application Ser. No. 10/832,022, entitled COMPOSITIONS AND METHODS FOR CONTROLLING INSECTS; U.S. application Ser. No. 11/086,615, entitled COMPOSITIONS AND METHODS FOR CONTROLLING INSECTS RELATED TO THE OCTOPAMINE RECEPTOR; U.S. application Ser. No. 11/365,426, entitled COMPOSITIONS AND METHODS FOR CONTROLLING INSECTS INVOLVING THE TYRAMINE RECEPTOR;

U.S. Provisional Application 60/807,600, entitled COMPOSITIONS AND METHODS FOR CONTROLLING INSECTS; U.S. Provisional Application 60/805,963, entitled COMPOSITIONS FOR TREATING PARASITIC INFECTIONS AND METHODS OF SCREENING FOR SAME;

U.S. Provisional Application 60/718,570, entitled COMPOSITIONS HAVING INSECT CONTROL ACTIVITY AND METHODS FOR USE THEREOF; U.S. application Ser. No. 12/009,220, entitled PEST CONTROL COMPOSITIONS AND METHODS.

One skilled in the art will recognize many methods and materials similar or equivalent to those described herein, which could be used in the practice of the present invention. Indeed, the present invention is in no way limited to the methods and materials described.

EXAMPLES

The following examples are provided to better illustrate the claimed invention and are not to be interpreted as limiting the scope of the invention. To the extent that specific materials are mentioned, it is merely for purposes of illustration and is not intended to limit the invention. One skilled in the art may develop equivalent means or reactants without the exercise of inventive capacity and without departing from the scope of the invention.

As readily understood by one of skill in the art, there are any number of additional blends, compounds and ingredients may also be used in conjunction with the various embodiments described herein. Thus, in addition to or in substitution of the specific ingredients and/or formulations described in the specification above and the following examples, there are additional combinations of blends and compounds that are within the scope of compounds claimed herein. For example, various compositions are provided, including a first agent comprising a blend selected from Table 1 (below) and a second agent comprising a formulation that enhances the activity of the first agent.

TABLE 1

BLENDS

| | Compounds | CAS Registry Number | low % | high % |
|---|---|---|---|---|
| Blend 1 | LFO | | 4 | 30 |
| | D-Limonene | 5989-27-5 | 8 | 99 |
| | Thyme Oil White | 8007-46-3 | 0.1 | 20 |
| | Blend 65 | | 8 | 99 |

TABLE 1-continued

BLENDS

| | Compounds | CAS Registry Number | low % | high % |
|---|---|---|---|---|
| Blend 2 | D-Limonene | 5989-27-5 | 9 | 99 |
| | Thyme Oil White | 8007-46-3 | 0.1 | 20 |
| | Linalool Coeur | 78-70-6 | 0.1 | 4 |
| | Tetrahydrolinalool | 78-69-3 | 0.1 | 5 |
| | Vanillin | 121-33-5 | 0.06 | 0.3 |
| | Isopropyl myristate | 110-27-0 | 0.1 | 5 |
| | Piperonal (aldehyde) [Heliotropine] | 120-57-0 | 0.1 | 5 |
| | Blend 66 | | 8 | 99 |
| | Geraniol Fine FCC | 106-24-1 | 0.1 | 4 |
| | Triethyl Citrate | 77-93-0 | 0.1 | 5 |
| Blend 3 | D-Limonene | 5989-27-5 | 45 | 99 |
| | Thyme Oil White | 8007-46-3 | 0.1 | 10 |
| | Blend 66 | | 5 | 30 |
| | Blend 63 | | 0.1 | 10 |
| Blend 4 | LFO | | 30 | 99 |
| | BSO | 977017-84-7 | 15 | 99 |
| Blend 5 | BSO | 977017-84-7 | 15 | 99 |
| | Linalool Coeur | 78-70-6 | 6 | 40 |
| | Tetrahydrolinalool | 78-69-3 | 8 | 45 |
| | Vanillin | 121-33-5 | 0.1 | 5 |
| | Isopropyl myristate | 110-27-0 | 10 | 55 |
| | Piperonal (aldehyde) [Heliotropine] | 120-57-0 | 0.1 | 20 |
| | Geraniol Fine FCC | 106-24-1 | 0.1 | 25 |
| Blend 6 | D-Limonene | 5989-27-5 | 0.1 | 25 |
| | BSO | 977017-84-7 | 15 | 85 |
| | Linalool Coeur | 78-70-6 | 0.1 | 25 |
| | Tetrahydrolinalool | 78-69-3 | 0.1 | 25 |
| | Vanillin | 121-33-5 | 0.1 | 3 |
| | Isopropyl myristate | 110-27-0 | 0.1 | 30 |
| | Piperonal (aldehyde) [Heliotropine] | 120-57-0 | 0.1 | 10 |
| | Geraniol Fine FCC | 106-24-1 | 0.1 | 15 |
| | Methyl Salicylate 98% Nat | 119-36-8 | 8 | 70 |
| Blend 7 | Thyme Oil White | 8007-46-3 | 15 | 90 |
| | Wintergreen Oil | 68917-75-9 | 15 | 99 |
| | Vanillin | 121-33-5 | 0.1 | 4 |
| | Isopropyl myristate | 110-27-0 | 20 | 99 |
| Blend 8 | D-Limonene | 5989-27-5 | 20 | 99 |
| | Thyme Oil White | 8007-46-3 | 0.1 | 25 |
| | Wintergreen Oil | 68917-75-9 | 25 | 99 |
| Blend 9 | LFO | | 6 | 40 |
| | D-Limonene | 5989-27-5 | 25 | 99 |
| | Thyme Oil White | 8007-46-3 | 5 | 30 |
| | Linalool Coeur | 78-70-6 | 0.1 | 3 |
| | Citral | 5392-40-5 | 0.1 | 20 |
| | gamma-terpinene | 99-85-4 | 0.1 | 20 |
| | Alpha-Pinene, 98% | 80-56-8 | 0.1 | 5 |
| | alpha-Terpineol | 98-55-5 | 0.1 | 15 |
| | Terpinolene | 586-62-9 | 0.1 | 15 |
| | Para-Cymene | 99-87-6 | 0.1 | 5 |
| | Linalyl Acetate | 115-95-7 | 0.1 | 6 |
| | Beta Pinene | 127-91-3 | 0.1 | 6 |
| | Camphor Dextro | 464-49-3 | 0.05 | 0.3 |
| | Terpinene 4 OL | 562-74-3 | 0.05 | 0.3 |
| | Alpha Terpinene | 99-86-5 | 0.1 | 6 |
| | Borneol L | 507-70-0 | 0.1 | 3 |
| | Camphene | 79-92-5 | 0.1 | 2 |
| | Decanal | 112-31-2 | 0.06 | 0.3 |
| | Dodecanal | 112-54-9 | 0.06 | 0.3 |
| | Fenchol Alpha | 512-13-0 | 0.005 | 0.1 |
| | Geranyl Acetate | 105-87-3 | 0.06 | 0.3 |
| | Isoborneol | 124-76-5 | 0.08 | 1 |
| | 2-Methyl 1,3-cyclohexadiene | 30640-46-1, 1888-90-0 | 0.08 | 1 |
| | Myrcene | 123-35-3 | 0.1 | 3 |
| | Nonanal | 124-19-6 | 0.005 | 0.08 |
| | Octanal | 124-13-0 | 0.005 | 0.2 |
| | Tocopherol Gamma (TENOX ®) | 54-28-4 | 0.005 | 0.08 |
| Blend 10 | D-Limonene | 5989-27-5 | 0.1 | 25 |
| | Thyme Oil White | 8007-46-3 | 0.1 | 25 |
| | Blend 65 | | 40 | 99 |
| | Linalool Coeur | 78-70-6 | 0.1 | 6 |
| | Tetrahydrolinalool | 78-69-3 | 0.1 | 8 |
| | Vanillin | 121-33-5 | 0.08 | 0.6 |
| | Isopropyl myristate | 110-27-0 | 0.1 | 8 |
| | Piperonal (aldehyde) [Heliotropine] | 120-57-0 | 0.1 | 8 |

TABLE 1-continued

BLENDS

| | Compounds | CAS Registry Number | low % | high % |
|---|---|---|---|---|
| | Geraniol Fine FCC | 106-24-1 | 0.1 | 4 |
| | Triethyl Citrate | 77-93-0 | 0.1 | 8 |
| Blend 11 | Thyme Oil White | 8007-46-3 | 3 | 65 |
| | Wintergreen Oil | 68917-75-9 | 15 | 99 |
| | Isopropyl myristate | 110-27-0 | 20 | 99 |
| Blend 12 | D-Limonene | 5989-27-5 | 5 | 30 |
| | Linalool Coeur | 78-70-6 | 8 | 40 |
| | Tetrahydrolinalool | 78-69-3 | 15 | 99 |
| | Vanillin | 121-33-5 | 0.1 | 8 |
| | Isopropyl myristate | 110-27-0 | 15 | 85 |
| | Piperonal (aldehyde)[Heliotropine] | 120-57-0 | 5 | 30 |
| | Geraniol Fine FCC | 106-24-1 | 5 | 30 |
| Blend 13 | D-Limonene | 5989-27-5 | 5 | 30 |
| | Geraniol Fine FCC | 106-24-1 | 5 | 30 |
| | Blend 62 | | 50 | 99 |
| Blend 14 | D-Limonene | 5989-27-5 | 5 | 30 |
| | Blend 72 | | 55 | 99 |
| Blend 15 | D-Limonene | 5989-27-5 | 5 | 30 |
| | Linalool Coeur | 78-70-6 | 10 | 55 |
| | Tetrahydrolinalool | 78-69-3 | 10 | 65 |
| | Vanillin | 121-33-5 | 0.1 | 4 |
| | Isopropyl myristate | 110-27-0 | 10 | 60 |
| | Piperonal (aldehyde)[Heliotropine] | 120-57-0 | 10 | 65 |
| | Piperonyl Alcohol | 495-76-1 | 0.1 | 25 |
| Blend 16 | D-Limonene | 5989-27-5 | 5 | 30 |
| | BSO | 977017-84-7 | 15 | 80 |
| | Linalool Coeur | 78-70-6 | 5 | 30 |
| | Tetrahydrolinalool | 78-69-3 | 6 | 35 |
| | Vanillin | 121-33-5 | 0.1 | 4 |
| | Mineral Oil White (USP) | 8042-47-5 | 8 | 45 |
| | Isopropyl myristate | 110-27-0 | 8 | 45 |
| | Piperonal (aldehyde)[Heliotropine] | 120-57-0 | 0.1 | 15 |
| | Geraniol Fine FCC | 106-24-1 | 0.1 | 20 |
| Blend 17 | D-Limonene | 5989-27-5 | 10 | 99 |
| | Linalool Coeur | 78-70-6 | 0.1 | 10 |
| | Tetrahydrolinalool | 78-69-3 | 0.1 | 10 |
| | Vanillin | 121-33-5 | 0.08 | 0.6 |
| | Isopropyl myristate | 110-27-0 | 0.1 | 10 |
| | Piperonal (aldehyde)[Heliotropine] | 120-57-0 | 0.1 | 10 |
| | Piperonyl Alcohol | 495-76-1 | 0.1 | 5 |
| | Blend 66 | | 10 | 99 |
| Blend 18 | Linalool Coeur | 78-70-6 | 0.1 | 15 |
| | Tetrahydrolinalool | 78-69-3 | 0.1 | 20 |
| | Vanillin | 121-33-5 | 0.1 | 2 |
| | Isopropyl myristate | 110-27-0 | 0.1 | 20 |
| | Piperonal (aldehyde)[Heliotropine] | 120-57-0 | 0.1 | 20 |
| | Piperonyl Alcohol | 495-76-1 | 0.1 | 10 |
| | Blend 66 | | 40 | 99 |
| Blend 19 | LFO | | 20 | 99 |
| | D-Limonene | 5989-27-5 | 15 | 85 |
| | Thyme Oil White | 8007-46-3 | 15 | 90 |
| Blend 20 | D-Limonene | 5989-27-5 | 15 | 85 |
| | Thyme Oil White | 8007-46-3 | 15 | 95 |
| | Blend 63 | | 20 | 99 |
| Blend 21 | D-Limonene | 5989-27-5 | 15 | 85 |
| | Thyme Oil White | 8007-46-3 | 15 | 90 |
| | Linalool Coeur | 78-70-6 | 0.1 | 15 |
| | Tetrahydrolinalool | 78-69-3 | 0.1 | 25 |
| | Vanillin | 121-33-5 | 0.1 | 2 |
| | Isopropyl myristate | 110-27-0 | 0.1 | 25 |
| | Piperonal (aldehyde)[Heliotropine] | 120-57-0 | 0.1 | 25 |
| | Geraniol Fine FCC | 106-24-1 | 0.1 | 10 |
| | Triethyl Citrate | 77-93-0 | 0.1 | 25 |
| Blend 22 | Phenyl Ethyl Propionate | | 20 | 99 |
| | Methyl Salicylate | | 20 | 99 |
| | Blend 43 | | 15 | 85 |
| Blend 23 | D-Limonene | 5989-27-5 | 0.1 | 10 |
| | Thyme Oil White | 8007-46-3 | 0.1 | 15 |
| | Benzyl Alcohol | 100-51-6 | 8 | 50 |
| | Isopar M | 64742-47-8 | 10 | 65 |
| | Water | 7732-18-5 | 25 | 99 |
| | Blend 63 | | 0.1 | 15 |
| | Stock 10% SLS Solution | | 0.1 | 10 |
| Blend 24 | D-Limonene | 5989-27-5 | 0.1 | 10 |
| | Thyme Oil White | 8007-46-3 | 0.1 | 15 |

TABLE 1-continued

BLENDS

| | Compounds | CAS Registry Number | low % | high % |
|---|---|---|---|---|
| | Linalool Coeur | 78-70-6 | 0.1 | 3 |
| | Tetrahydrolinalool | 78-69-3 | 0.1 | 4 |
| | Vanillin | 121-33-5 | 0.05 | 0.3 |
| | Isopropyl myristate | 110-27-0 | 0.1 | 4 |
| | Piperonal (aldehyde)[Heliotropine] | 120-57-0 | 0.1 | 4 |
| | Geraniol Fine FCC | 106-24-1 | 0.1 | 2 |
| | Triethyl Citrate | 77-93-0 | 0.1 | 4 |
| | Benzyl Alcohol | 100-51-6 | 8 | 50 |
| | Isopar M | 64742-47-8 | 10 | 65 |
| | Water | 7732-18-5 | 25 | 99 |
| | Stock 10% SLS Solution | | 0.1 | 10 |
| Blend 25 | D-Limonene | 5989-27-5 | 6 | 40 |
| | Thyme Oil White | 8007-46-3 | 8 | 45 |
| | Benzyl Alcohol | 100-51-6 | 30 | 99 |
| | Blend 63 | | 10 | 55 |
| Blend 26 | LFO | | 0.1 | 25 |
| | D-Limonene | 5989-27-5 | 8 | 99 |
| | Thyme Oil White | 8007-46-3 | 0.1 | 20 |
| | Blend 66 | | 8 | 99 |
| Blend 27 | Linalool Coeur | 78-70-6 | 0.1 | 20 |
| | Soy Bean Oil | 8016-70-4 | 10 | 70 |
| | Thymol (crystal) | 89-83-8 | 20 | 99 |
| | Alpha-Pinene, 98% | 80-56-8 | 0.1 | 10 |
| | Para-Cymene | 99-87-6 | 15 | 85 |
| Blend 28 | Linalool Coeur | 78-70-6 | 0.1 | 25 |
| | Thymol (crystal) | 89-83-8 | 25 | 99 |
| | Alpha-Pinene, 98% | 80-56-8 | 0.1 | 15 |
| | Para-Cymene | 99-87-6 | 20 | 99 |
| Blend 29 | D-Limonene | 5989-27-5 | 0.1 | 25 |
| | Thyme Oil White | 8007-46-3 | 0.1 | 30 |
| | Blend 65 | | 35 | 99 |
| | Linalool Coeur | 78-70-6 | 0.1 | 8 |
| | Tetrahydrolinalool | 78-69-3 | 0.1 | 10 |
| | Vanillin | 121-33-5 | 0.08 | 1 |
| | Isopropyl myristate | 110-27-0 | 0.1 | 10 |
| | Piperonal (aldehyde)[Heliotropine] | 120-57-0 | 0.1 | 5 |
| | Geraniol Fine FCC | 106-24-1 | 0.1 | 5 |
| Blend 30 | D-Limonene | 5989-27-5 | 15 | 85 |
| | Thyme Oil White | 8007-46-3 | 0.1 | 15 |
| | Methyl Salicylate | | 35 | 99 |
| Blend 31 | Thyme Oil White | 8007-46-3 | 0.1 | 5 |
| | Wintergreen Oil | 68917-75-9 | 0.1 | 8 |
| | Isopropyl myristate | 110-27-0 | 0.1 | 6 |
| | Span 80 | 1338-43-8 | 0.1 | 2 |
| | Isopar M | 64742-47-8 | 8 | 45 |
| | Water | 7732-18-5 | 40 | 99 |
| | Bifenthrin | 83657-04-3 | 0.005 | 0.2 |
| Blend 32 | Castor Oil hydrogenated - PEO40 | | 30 | 99 |
| | Lemon Grass Oil - India | | 10 | 70 |
| | Blend 1 | | 10 | 70 |
| Blend 33 | LFO | | 8 | 50 |
| | D-Limonene | 5989-27-5 | 35 | 99 |
| | Thyme Oil White | 8007-46-3 | 6 | 35 |
| | BSO | 977017-84-7 | 0.1 | 15 |
| Blend 34 | D-Limonene | 5989-27-5 | 0.1 | 25 |
| | Thyme Oil White | 8007-46-3 | 0.1 | 30 |
| | Blend 65 | | 30 | 99 |
| | Linalool Coeur | 78-70-6 | 0.1 | 5 |
| | Tetrahydrolinalool | 78-69-3 | 0.1 | 8 |
| | Vanillin | 121-33-5 | 0.06 | 0.5 |
| | Isopropyl myristate | 110-27-0 | 0.1 | 8 |
| | Piperonal (aldehyde)[Heliotropine] | 120-57-0 | 0.1 | 8 |
| | Geraniol Fine FCC | 106-24-1 | 0.1 | 4 |
| | Triethyl Citrate | 77-93-0 | 0.1 | 8 |
| | Isopar M | 64742-47-8 | 8 | 40 |
| Blend 35 | Isopropyl myristate | 110-27-0 | 20 | 99 |
| | Wintergreen Oil | | 25 | 99 |
| | Blend 68 | | 10 | 60 |
| Blend 36 | Wintergreen Oil | 68917-75-9 | 25 | 99 |
| | Isopropyl myristate | 110-27-0 | 20 | 99 |
| | Thyme Oil Red | 8007-46-3 | 10 | 60 |
| Blend 37 | Wintergreen Oil | 68917-75-9 | 25 | 99 |
| | Vanillin | 121-33-5 | 0.06 | 0.3 |
| | Isopropyl myristate | 110-27-0 | 20 | 99 |
| | Thyme Oil Red | 8007-46-3 | 10 | 60 |

TABLE 1-continued

BLENDS

| | Compounds | CAS Registry Number | low % | high % |
|---|---|---|---|---|
| Blend 38 | Thyme Oil White | 8007-46-3 | 15 | 95 |
| | Isopropyl myristate | 110-27-0 | 25 | 99 |
| | Geraniol Fine FCC | 106-24-1 | 10 | 70 |
| Blend 39 | Isopropyl myristate | 110-27-0 | 25 | 99 |
| | Geraniol Fine FCC | 106-24-1 | 10 | 70 |
| | Thyme Oil White | 8007-46-3 | 20 | 99 |
| Blend 40 | Orange Terpenes | 68647-72-3 | 0.1 | 25 |
| | Blend 68 | | 0.1 | 30 |
| | Blend 69 | | 35 | 99 |
| | Blend 71 | | 6 | 40 |
| Blend 41 | Linalool Coeur | 78-70-6 | 10 | 70 |
| | Amyl Butyrate | 540-18-1 | 10 | 70 |
| | Anise Star Oil | | 30 | 99 |
| Blend 42 | Thyme Oil White | 8007-46-3 | 15 | 75 |
| | Amyl Butyrate | 540-18-1 | 10 | 70 |
| | Anise Star Oil | | 30 | 99 |
| Blend 43 | Tetrahydrolinalool | 78-69-3 | 10 | 70 |
| | Vanillin | 121-33-5 | 0.1 | 4 |
| | Hercolyn D | 8050-15-5 | 0.1 | 15 |
| | Isopropyl myristate | 110-27-0 | 8 | 45 |
| | Piperonal (aldehyde)[Heliotropine] | 120-57-0 | 0.1 | 25 |
| | Ethyl Linalool | 10339-55-6 | 10 | 70 |
| | Hedione | 24851-98-7 | 0.1 | 20 |
| | Triethyl Citrate | 77-93-0 | 5 | 30 |
| | Dipropylene glycol (DPG) | 246-770-3 | 0.1 | 25 |
| Blend 44 | Blend 63 | | 25 | 99 |
| | Thyme Oil White | | 30 | 99 |
| Blend 45 | Linalool coeur | 78-70-6 | 0.1 | 20 |
| | Tetrahydrolinalool | 78-69-3 | 0.1 | 25 |
| | Vanillin | 121-33-5 | 0.1 | 2 |
| | Isopropyl myristate | 110-27-0 | 0.1 | 30 |
| | Piperonal (aldehyde)[Heliotropine] | 120-57-0 | 0.1 | 30 |
| | Geraniol Fine FCC | 106-24-1 | 0.1 | 15 |
| | Triethyl citrate | 77-93-0 | 0.1 | 30 |
| | Thyme Oil White | | 30 | 99 |
| Blend 46 | Phenyl Ethyl Propionate | | 10 | 55 |
| | Benzyl Alcohol | 100-51-6 | 30 | 99 |
| | Methyl Salicylate | | 10 | 55 |
| | Blend 43 | | 8 | 40 |
| Blend 47 | Thyme Oil White | 8007-46-3 | 15 | 75 |
| | Amyl Butyrate | 540-18-1 | 10 | 70 |
| | Anise Star Oil | | 30 | 99 |
| | Genistein | | 0.005 | 0.1 |
| Blend 48 | Linalool coeur | 78-70-6 | 10 | 70 |
| | Amyl Butyrate | 540-18-1 | 10 | 70 |
| | Anise Star Oil | | 30 | 99 |
| | Thyme Oil White | | 0.005 | 0.1 |
| Blend 49 | LFO | | 10 | 70 |
| | BSO | 977017-84-7 | 10 | 70 |
| | Benzyl Alcohol | 100-51-6 | 30 | 99 |
| Blend 50 | Isopropyl myristate | 110-27-0 | 10 | 70 |
| | Wintergreen oil | | 15 | 90 |
| | Thyme oil white | | 8 | 40 |
| | Myristicin | | 15 | 99 |
| Blend 51 | Isopropyl myristate | 110-27-0 | 15 | 80 |
| | Wintergreen oil | | 15 | 95 |
| | Isopropyl alcohol | 67-63-0 | 0.1 | 10 |
| | Thyme oil white | | 8 | 40 |
| | Myristicin | | 15 | 75 |
| Blend 52 | Isopropyl myristate | 110-27-0 | 20 | 99 |
| | Wintergreen oil | | 25 | 99 |
| | Thyme oil white | | 10 | 60 |
| | Genistein | | 0.001 | 0.1 |
| Blend 53 | Isopropyl myristate | 110-27-0 | 20 | 99 |
| | Wintergreen oil | | 20 | 99 |
| | Isopropyl alcohol | 67-63-0 | 5 | 30 |
| | Thyme oil white | | 8 | 50 |
| | Genistein | | 0.001 | 0.1 |
| Blend 54 | Isopropyl myristate | 110-27-0 | 10 | 70 |
| | Wintergreen oil | | 15 | 90 |
| | Thyme oil white | | 8 | 40 |
| | Genistein | | 0.001 | 0.1 |
| | Myristicin | | 15 | 99 |

TABLE 1-continued

| | BLENDS | | | |
|---|---|---|---|---|
| | Compounds | CAS Registry Number | low % | high % |
| Blend 55 | Mineral oil white | 8042-47-5 | 20 | 99 |
| | Wintergreen oil | | 25 | 99 |
| | Thyme oil white | | 10 | 60 |
| Blend 56 | Mineral oil white | 8042-47-5 | 10 | 50 |
| | Wintergreen oil | | 10 | 65 |
| | Thyme oil white | | 5 | 30 |
| | Benzaldehyde | | 30 | 99 |
| Blend 57 | Mineral oil white | 8042-47-5 | 10 | 55 |
| | Wintergreen oil | | 10 | 65 |
| | Thyme oil white | | 5 | 30 |
| | Genistein | | 15 | 75 |
| | Benzaldehyde | | 15 | 80 |
| Blend 58 | Linalool Coeur | 78-70-6 | 4 | 65 |
| | Thymol (crystal) | 89-83-8 | 20 | 99 |
| | Alpha-Pinene, 98% | 80-56-8 | 1 | 10 |
| | Para-Cymene | 99-87-6 | 1 | 55 |
| | Trans-Anethole | 4180-23-8 | 10 | 55 |
| Blend 59 | Linalool Coeur | 78-70-6 | 0.1 | 30 |
| | Thymol (crystal) | 89-83-8 | 25 | 99 |
| | Alpha-Pinene, 98% | 80-56-8 | 0.1 | 30 |
| | Para-Cymene | 99-87-6 | 15 | 99 |
| Blend 60 | Soy Bean Oil | 8016-70-4 | 15 | 75 |
| | Alpha-Pinene, 98% | 80-56-8 | 0.1 | 10 |
| | Para-Cymene | 99-87-6 | 15 | 85 |
| | Linalyl Acetate | 115-95-7 | 0.1 | 20 |
| | Thymol acetate | 528-79-0 | 20 | 99 |
| Blend 61 | Alpha-Pinene, 98% | 80-56-8 | 0.1 | 30 |
| | Para-Cymene | 99-87-6 | 10 | 55 |
| | Linalyl Acetate | 115-95-7 | 10 | 70 |
| | Thymol acetate | 528-79-0 | 30 | 99 |
| Blend 62 | Linalool Coeur | 78-70-6 | 10 | 60 |
| | Tetrahydrolinalool | 78-69-3 | 10 | 70 |
| | Vanillin | 121-33-5 | 0.1 | 8 |
| | Isopropyl myristate | 110-27-0 | 15 | 90 |
| | Piperonal (aldehyde)[Heliotropine] | 120-57-0 | 5 | 30 |
| | Geraniol Fine FCC | 106-24-1 | 8 | 40 |
| Blend 63 | Linalool Coeur | 78-70-6 | 8 | 40 |
| | Tetrahydrolinalool | 78-69-3 | 10 | 55 |
| | Vanillin | 121-33-5 | 0.1 | 4 |
| | Isopropyl myristate | 110-27-0 | 10 | 55 |
| | Piperonal (aldehyde)[Heliotropine] | 120-57-0 | 10 | 55 |
| | Geraniol Fine FCC | 106-24-1 | 5 | 30 |
| | Triethyl Citrate | 77-93-0 | 10 | 55 |
| Blend 64 | Linalool Coeur | 78-70-6 | 10 | 60 |
| | Tetrahydrolinalool | 78-69-3 | 10 | 70 |
| | Vanillin | 121-33-5 | 0.1 | 4 |
| | Isopropyl myristate | 110-27-0 | 10 | 70 |
| | Piperonal (aldehyde)[Heliotropine] | 120-57-0 | 10 | 70 |
| | Piperonyl Alcohol | 495-76-1 | 0.1 | 30 |
| Blend 65 | D-Limonene | 5989-27-5 | 25 | 99 |
| | Linalool Coeur | 78-70-6 | 0.1 | 4 |
| | Citral | 5392-40-5 | 5 | 30 |
| | gamma-terpinene | 99-85-4 | 5 | 30 |
| | Alpha-Pinene, 98% | 80-56-8 | 0.1 | 6 |
| | alpha-Terpineol | 98-55-5 | 0.1 | 20 |
| | Terpinolene | 586-62-9 | 0.1 | 20 |
| | Para-Cymene | 99-87-6 | 0.1 | 5 |
| | Linalyl Acetate | 115-95-7 | 0.1 | 8 |
| | Beta Pinene | 127-91-3 | 0.1 | 10 |
| | Camphor Dextro | 464-49-3 | 0.06 | 0.3 |
| | Terpinene 4 OL | 562-74-3 | 0.06 | 0.3 |
| | Alpha Terpinene | 99-86-5 | 0.1 | 10 |
| | Borneol L | 507-70-0 | 0.1 | 5 |
| | Camphene | 79-92-5 | 0.1 | 2 |
| | Decanal | 112-31-2 | 0.08 | 0.6 |
| | Dodecanal | 112-54-9 | 0.06 | 0.3 |
| | Fenchol Alpha | 512-13-0 | 0.001 | 0.1 |
| | Geranyl Acetate | 105-87-3 | 0.08 | 0.6 |
| | Isoborneol | 124-76-5 | 0.1 | 2 |
| | 2-Methyl 1,3-cyclohexadiene | 30640-46-1, 1888-90-0 | 0.1 | 2 |
| | Myrcene | 123-35-3 | 0.1 | 4 |
| | Nonanal | 124-19-6 | 0.001 | 0.1 |
| | Octanal | 124-13-0 | 0.05 | 0.2 |
| | Tocopherol Gamma (TENOX ®) | 54-28-4 | 0.001 | 0.1 |

TABLE 1-continued

BLENDS

| | Compounds | CAS Registry Number | low % | high % |
|---|---|---|---|---|
| Blend 66 | D-Limonene | 5989-27-5 | 30 | 99 |
| | Linalool Coeur | 78-70-6 | 0.1 | 5 |
| | gamma-terpinene | 99-85-4 | 6 | 40 |
| | Alpha-Pinene, 98% | 80-56-8 | 0.1 | 8 |
| | Terpinolene | 586-62-9 | 0.1 | 25 |
| | Para-Cymene | 99-87-6 | 0.1 | 6 |
| | Linalyl Acetate | 115-95-7 | 0.1 | 10 |
| | Beta Pinene | 127-91-3 | 0.1 | 10 |
| | Camphor Dextro | 464-49-3 | 0.1 | 10 |
| | Terpinene 4 OL | 562-74-3 | 0.06 | 0.3 |
| | Alpha Terpinene | 99-86-5 | 0.08 | 0.6 |
| | Borneol L | 507-70-0 | 0.1 | 5 |
| | Camphene | 79-92-5 | 0.1 | 3 |
| | Decanal | 112-31-2 | 0.08 | 0.6 |
| | Dodecanal | 112-54-9 | 0.08 | 0.6 |
| | Fenchol Alpha | 512-13-0 | 0.001 | 0.1 |
| | Geranyl Acetate | 105-87-3 | 0.08 | 0.6 |
| | Isoborneol | 124-76-5 | 0.1 | 2 |
| | 2-Methyl 1,3-cyclohexadiene | 30640-46-1, 1888-90-0 | 0.1 | 2 |
| | Myrcene | 123-35-3 | 0.1 | 5 |
| | Nonanal | 124-19-6 | 0.001 | 0.2 |
| | Octanal | 124-13-0 | 0.05 | 0.3 |
| | Tocopherol Gamma (TENOX ®) | 54-28-4 | 0.001 | 0.2 |
| Blend 67 | D-Limonene | 5989-27-5 | 20 | 99 |
| | Linalool Coeur | 78-70-6 | 5 | 30 |
| | Alpha-Pinene, 98% | 80-56-8 | 0.1 | 15 |
| | Terpinolene | 586-62-9 | 5 | 30 |
| | Para-Cymene | 99-87-6 | 5 | 30 |
| | Linalyl Acetate | 115-95-7 | 0.1 | 15 |
| | Beta Pinene | 127-91-3 | 0.1 | 15 |
| | Alpha Terpinene | 99-86-5 | 0.1 | 15 |
| | Camphene | 79-92-5 | 0.1 | 20 |
| | Myrcene | 123-35-3 | 0.1 | 30 |
| Blend 68 | D-Limonene | 5989-27-5 | 0.08 | 1 |
| | Thyme Oil Red | 8007-46-3 | 0.1 | 4 |
| | Thymol (crystal) | 89-83-8 | 30 | 99 |
| | alpha-Terpineol | 98-55-5 | 0.1 | 6 |
| | Para-Cymene | 99-87-6 | 10 | 60 |
| | Linalyl Acetate | 115-95-7 | 0.1 | 5 |
| | Caryophyllene-B | 87-44-5 | 0.1 | 10 |
| | Borneol L | 507-70-0 | 0.1 | 6 |
| | Myrcene | 123-35-3 | 0.1 | 4 |
| | Tea Tree Oil | | 0.1 | 6 |
| | Cypress Oil | | 0.1 | 10 |
| | Peppermint Terpenes | 8006-90-4 | 0.1 | 30 |
| | Linalool 90 | | 0.1 | 10 |
| Blend 69 | D-Limonene | 5989-27-5 | 30 | 99 |
| | Citral | 5392-40-5 | 0.1 | 25 |
| | gamma-terpinene | 99-85-4 | 5 | 30 |
| | Alpha-Pinene, 98% | 80-56-8 | 0.1 | 5 |
| | alpha-Terpineol | 98-55-5 | 0.1 | 15 |
| | Terpinolene | 586-62-9 | 0.1 | 20 |
| | Lime Distilled Oil | | 0.06 | 0.3 |
| | Lime Expressed Oil | | 0.06 | 0.3 |
| | Linalyl Acetate | 115-95-7 | 0.1 | 6 |
| | Caryophyllene-B | 87-44-5 | 0.06 | 0.3 |
| | Beta Pinene | 127-91-3 | 0.1 | 8 |
| | Terpinene 4 OL | 562-74-3 | 0.005 | 0.2 |
| | Alpha Terpinene | 99-86-5 | 0.1 | 6 |
| | Borneol L | 507-70-0 | 0.1 | 5 |
| | Camphene | 79-92-5 | 0.1 | 2 |
| | Geranyl Acetate | 105-87-3 | 0.08 | 0.6 |
| | Isoborneol | 124-76-5 | 0.06 | 0.3 |
| | Linalool 90 | | 0.1 | 3 |
| | Camphor Gum | | 0.005 | 0.2 |
| | Aldehyde C-10 | | 0.005 | 0.2 |
| | Aldehyde C-12 | | 0.06 | 0.3 |
| Blend 70 | Eugenol | 97-53-0 | 0.003 | 0.1 |
| | Eucalyptol (1,8 Cineole) | | 0.05 | 0.3 |
| | Methyl Salicylate | | 60 | 99.9 |
| | Linalool 90 | | 0.05 | 0.3 |
| | Ethyl Salicylate | | 0.05 | 0.3 |
| Blend 71 | Tetrahydrolinalool | 78-69-3 | 6 | 35 |
| | Hercolyn D | 8050-15-5 | 0.1 | 25 |

TABLE 1-continued

BLENDS

| | Compounds | CAS Registry Number | low % | high % |
|---|---|---|---|---|
| | Isopropyl myristate | 110-27-0 | 0.1 | 20 |
| | Piperonal (aldehyde)[Heliotropine] | 120-57-0 | 5 | 30 |
| | Ethyl Linalool | 10339-55-6 | 5 | 30 |
| | Triethyl Citrate | 77-93-0 | 0.1 | 30 |
| | Dipropylene glycol (DPG) | 246-770-3 | 5 | 30 |
| | Cinnamic Alcohol | 104-54-1 | 0.1 | 5 |
| | Eugenol | 97-53-0 | 0.1 | 5 |
| | Phenyl Ethyl Alcohol | 60-12-8 | 10 | 65 |
| | Iso Eugenol | | 0.08 | 1 |
| | Methyl Dihydrojasmonate | | 5 | 30 |
| Blend 72 | Linalool Coeur | 78-70-6 | 8 | 40 |
| | Tetrahydrolinalool | 78-69-3 | 10 | 70 |
| | Vanillin | 121-33-5 | 0.1 | 8 |
| | Isopropyl myristate | 110-27-0 | 15 | 85 |
| | Piperonal (aldehyde)[Heliotropine] | 120-57-0 | 5 | 30 |
| | Piperonyl Alcohol | 495-76-1 | 5 | 30 |
| | Geraniol Fine FCC | 106-24-1 | 5 | 30 |
| Blend 73 | Blend 11 | | 50 | 99 |
| | Stock 10% SLS Solution | | 5 | 30 |
| Blend 74 | Polyglycerol-4-oleate | 9007-48-1 | 0.1 | 3 |
| | Lecithin | 8002-43-5 | 0.08 | 0.6 |
| | Water | 7732-18-5 | 5 | 30 |
| | Blend 11 | | 50 | 99 |
| Blend 75 | Potassium Sorbate | 590-00-1 or 24634-61-5 | 0.1 | 4 |
| | Xanthan Gum | 11138-66-2 | 0.08 | 1 |
| | Water | 7732-18-5 | 45 | 99 |
| | Blend 74 | | 10 | 50 |
| Blend 76 | Potassium Sorbate | 590-00-1 or 24634-61-5 | 0.1 | 2 |
| | Polyglycerol-4-oleate | 9007-48-1 | 0.1 | 2 |
| | Xanthan Gum | 11138-66-2 | 0.08 | 1 |
| | Lecithin | 8002-43-5 | 0.06 | 0.3 |
| | Water | 7732-18-5 | 20 | 99 |
| | Blend 11 | | 15 | 99 |
| Blend 77 | Thyme Oil White | 8007-46-3 | 0.1 | 25 |
| | Wintergreen Oil | 68917-75-9 | 2 | 55 |
| | Isopropyl myristate | 110-27-0 | 1 | 40 |
| | Potassium Sorbate | 590-00-1 or 24634-61-5 | 0.06 | 0.3 |
| | Polyglycerol-4-oleate | 9007-48-1 | 0.1 | 2 |
| | Xanthan Gum | 11138-66-2 | 0.08 | 1 |
| | Lecithin | 8002-43-5 | 0.06 | 0.3 |
| | Water | 7732-18-5 | 20 | 99 |
| Blend 78 | Polyglycerol-4-oleate | 9007-48-1 | 0.1 | 3 |
| | Lecithin | 8002-43-5 | 0.08 | 0.6 |
| | Water | 7732-18-5 | 5 | 30 |
| | Blend 11 | | 50 | 99 |
| Blend 79 | Water | 7732-18-5 | 0.1 | 20 |
| | Blend 74 | | 40 | 99 |
| | Stock 2.5% Xanthan-1% Ksorbate | | 6 | 40 |
| Blend 80 | Water | 7732-18-5 | 0.1 | 10 |
| | Blend 78 | | 45 | 99 |
| | Stock 2.5% Xanthan-1% Ksorbate | | 6 | 40 |
| Blend 81 | Potassium Sorbate | 590-00-1 or 24634-61-5 | 0.1 | 4 |
| | Xanthan Gum | 11138-66-2 | 0.08 | 1 |
| | Water | 7732-18-5 | 45 | 99 |
| | Blend 78 | | 10 | 50 |
| Blend 82 | Blend 1 | | 0.1 | 8 |
| | Water | | 60 | 99 |
| Blend 83 | Polyglycerol-4-oleate | 9007-48-1 | 0.1 | 3 |
| | Lecithin | 8002-43-5 | 0.08 | 0.6 |
| | Water | 7732-18-5 | 5 | 30 |
| | Blend 11 | | 50 | 99 |
| Blend 84 | Potassium Sorbate | 590-00-1 or 24634-61-5 | 0.1 | 4 |
| | Xanthan Gum | 11138-66-2 | 0.08 | 1 |
| | Water | 7732-18-5 | 45 | 99 |
| | Blend 83 | | 10 | 50 |

TABLE 1-continued

BLENDS

| | Compounds | CAS Registry Number | low % | high % |
|---|---|---|---|---|
| Blend 85 | *Citronella* Oil | 106-22-9 | 0.08 | 0.6 |
| | Carbopol 940 | [9003-01-4] | 0.08 | 0.6 |
| | BHT (butylated hydroxytoluene) | 128-37-0 | 0.06 | 0.3 |
| | Water | 7732-18-5 | 30 | 99 |
| | Emulsifying Wax | 67762-27-0, 9005-67-8 | 8 | 40 |
| | Light Liquid Paraffin | 8012-95-1 | 0.1 | 10 |
| | White Soft Paraffin | [8009-03-8] | 0.1 | 25 |
| | Sodium Metabisulphate | [7681-57-4] | 0.08 | 1 |
| | Propylene Glycol | [57-55-6] | 0.1 | 6 |
| | Methyl Paraben | [99-76-3] | 0.08 | 0.6 |
| | Propyl Paraben | [94-13-3] | 0.005 | 0.2 |
| | Cresmer RH40 hydrogenated castor oil | [61791-12-6] | 0.1 | 15 |
| | Triethanolamine | [102-71-6] | 0.08 | 0.6 |
| | Vitamin E Acetate | [58-95-7] | 0.002 | 0.08 |
| | Disodium EDTA | [139-33-3] | 0.005 | 0.2 |
| | Blend 1 | | 0.1 | 15 |
| Blend 86 | Span 80 | 1338-43-8 | 0.005 | 0.2 |
| | Sodium Benzoate | 532-32-1 | 0.08 | 0.6 |
| | Isopar M | 64742-47-8 | 15 | 85 |
| | A46 Propellant | | 8 | 45 |
| | Water | 7732-18-5 | 25 | 99 |
| | Isopropyl alcohol | 67-63-0 | 0.1 | 5 |
| | Blend 8 | | 6 | 40 |
| Blend 87 | Isopar M | 64742-47-8 | 30 | 99 |
| | A46 Propellant | | 20 | 99 |
| | Isopropyl alcohol | 67-63-0 | 0.1 | 10 |
| | Blend 25 | | 0.1 | 20 |
| Blend 88 | Isopar M | 64742-47-8 | 30 | 99 |
| | A46 Propellant | | 20 | 99 |
| | Bifenthrin | 83657-04-3 | 0.005 | 0.2 |
| | Isopropyl alcohol | 67-63-0 | 0.1 | 10 |
| | Blend 25 | | 0.1 | 20 |
| Blend 89 | Isopar M | 64742-47-8 | 30 | 99 |
| | A46 Propellant | | 20 | 99 |
| | Blend 20 | | 0.1 | 20 |
| Blend 90 | Potassium Sorbate | 590-00-1 or 24634-61-5 | 0.06 | 0.3 |
| | Polyglycerol-4-oleate | 9007-48-1 | 0.08 | 0.6 |
| | Xanthan Gum | 11138-66-2 | 0.08 | 0.6 |
| | Lecithin | 8002-43-5 | 0.003 | 0.1 |
| | Water | 7732-18-5 | 45 | 99 |
| | Isopropyl alcohol | 67-63-0 | 0.1 | 8 |
| | Blend 35 | | 8 | 45 |
| Blend 91 | Potassium Sorbate | 590-00-1 or 24634-61-5 | 0.06 | 0.3 |
| | Polyglycerol-4-oleate | 9007-48-1 | 0.08 | 0.6 |
| | Xanthan Gum | 11138-66-2 | 0.08 | 1 |
| | Lecithin | 8002-43-5 | 0.003 | 0.1 |
| | Water | 7732-18-5 | 50 | 99 |
| | Blend 35 | | 8 | 40 |
| Blend 92 | Isopropyl myristate | 110-27-0 | 0.1 | 10 |
| | Geraniol Fine FCC | 106-24-1 | 0.1 | 8 |
| | Potassium Sorbate | 590-00-1 or 24634-61-5 | 0.06 | 0.3 |
| | Polyglycerol-4-oleate | 9007-48-1 | 0.1 | 2 |
| | Xanthan Gum | 11138-66-2 | 0.08 | 1 |
| | Lecithin | 8002-43-5 | 0.05 | 0.2 |
| | Water | 7732-18-5 | 50 | 99 |
| | Blend 68 | | 0.1 | 10 |
| | Isopropyl alcohol | 67-63-0 | 0.1 | 8 |
| Blend 93 | Wintergreen Oil | 68917-75-9 | 0.1 | 15 |
| | Isopropyl myristate | 110-27-0 | 0.1 | 10 |
| | Thyme Oil Red | 8007-46-3 | 0.1 | 6 |
| | Stock 0.3% SLS-0.1% Xanthan Soln | | 55 | 99 |
| Blend 94 | Stock 0.3% SLS & 0.1% Xanthan Soln | | 60 | 99 |
| | Blend 38 | | 0.1 | 15 |
| Blend 95 | Lecithin, Soya | 8030-76-0 | 0.08 | 0.6 |
| | Polyglycerol-4-oleate | 9007-48-1 | 0.1 | 3 |
| | Water | 7732-18-5 | 5 | 30 |
| | Blend 11 | | 50 | 99 |
| Blend 96 | Thyme Oil White | 8007-46-3 | 20 | 99 |
| | Isopropyl myristate | 110-27-0 | 15 | 95 |
| | Lecithin, Soya | 8030-76-0 | 0.08 | 0.6 |
| | Polyglycerol-4-oleate | 9007-48-1 | 0.1 | 3 |

TABLE 1-continued

BLENDS

| | Compounds | CAS Registry Number | low % | high % |
|---|---|---|---|---|
| | Water | 7732-18-5 | 5 | 30 |
| | Wintergreen Oil | | 10 | 65 |
| Blend 97 | Lecithin, Soya | 8030-76-0 | 0.06 | 0.3 |
| | Polyglycerol-4-oleate | 9007-48-1 | 0.1 | 3 |
| | Water | 7732-18-5 | 5 | 30 |
| | Blend 7 | | 50 | 99 |
| Blend 98 | Thyme Oil White | 8007-46-3 | 10 | 55 |
| | Wintergreen Oil | 68917-75-9 | 20 | 99 |
| | Vanillin | 121-33-5 | 0.1 | 4 |
| | Isopropyl myristate | 110-27-0 | 15 | 90 |
| | Lecithin, Soya | 8030-76-0 | 0.06 | 0.3 |
| | Polyglycerol-4-oleate | 9007-48-1 | 0.1 | 3 |
| | Water | 7732-18-5 | 5 | 30 |
| Blend 99 | Polyglycerol-4-oleate | 9007-48-1 | 0.1 | 6 |
| | Water | 7732-18-5 | 0.1 | 25 |
| | Blend 11 | | 50 | 99 |
| Blend 100 | Thyme Oil White | 8007-46-3 | 20 | 99 |
| | Isopropyl myristate | 110-27-0 | 15 | 95 |
| | Polyglycerol-4-oleate | 9007-48-1 | 0.1 | 6 |
| | Water | 7732-18-5 | 0.1 | 25 |
| | Wintergreen Oil | | 10 | 65 |
| Blend 101 | Potassium Sorbate | 590-00-1 or 24634-61-5 | 0.06 | 0.3 |
| | Polyglycerol-4-oleate | 9007-48-1 | 0.1 | 6 |
| | Xanthan Gum | 11138-66-2 | 0.08 | 1 |
| | Water | 7732-18-5 | 50 | 99 |
| | Blend 97 | | 6 | 35 |
| Blend 102 | D-Limonene | 5989-27-5 | 0.1 | 15 |
| | Thyme Oil White | 8007-46-3 | 0.1 | 5 |
| | Lecithin, Soya | 8030-76-0 | 0.001 | 0.04 |
| | Potassium Sorbate | 590-00-1 or 24634-61-5 | 0.06 | 0.3 |
| | Polyglycerol-4-oleate | 9007-48-1 | 0.1 | 6 |
| | Xanthan Gum | 11138-66-2 | 0.08 | 1 |
| | Water | 7732-18-5 | 50 | 99 |
| | Wintergreen Oil | | 0.1 | 10 |
| Blend 103 | Potassium Sorbate | 590-00-1 or 24634-61-5 | 0.06 | 0.3 |
| | Xanthan Gum | 11138-66-2 | 0.08 | 1 |
| | Water | 7732-18-5 | 50 | 99 |
| | Blend 95 | | 6 | 35 |
| Blend 104 | Thyme Oil White | 8007-46-3 | 0.1 | 10 |
| | Isopropyl myristate | 110-27-0 | 0.1 | 10 |
| | Lecithin, Soya | 8030-76-0 | 0.002 | 0.08 |
| | Potassium Sorbate | 590-00-1 or 24634-61-5 | 0.06 | 0.3 |
| | Polyglycerol-4-oleate | 9007-48-1 | 0.06 | 0.3 |
| | Xanthan Gum | 11138-66-2 | 0.08 | 1 |
| | Water | 7732-18-5 | 55 | 99 |
| | Wintergreen Oil | | 0.1 | 8 |
| Blend 105 | Potassium Sorbate | 590-00-1 or 24634-61-5 | 0.06 | 0.3 |
| | Xanthan Gum | 11138-66-2 | 0.08 | 1 |
| | Water | 7732-18-5 | 50 | 99 |
| | Blend 99 | | 6 | 35 |
| Blend 106 | Thyme Oil White | 8007-46-3 | 0.1 | 10 |
| | Wintergreen Oil | 68917-75-9 | 0.1 | 8 |
| | Isopropyl myristate | 110-27-0 | 0.1 | 10 |
| | Potassium Sorbate | 590-00-1 or 24634-61-5 | 0.06 | 0.3 |
| | Polyglycerol-4-oleate | 9007-48-1 | 0.08 | 0.6 |
| | Xanthan Gum | 11138-66-2 | 0.08 | 1 |
| | Water | 7732-18-5 | 55 | 99 |
| Blend 107 | Potassium Sorbate | 590-00-1 or 24634-61-5 | 0.1 | 4 |
| | Xanthan Gum | 11138-66-2 | 0.1 | 8 |
| | Water | 7732-18-5 | 60 | 99 |
| Blend 108 | Sodium Benzoate | 532-32-1 | 0.1 | 6 |
| | Water | 7732-18-5 | 60 | 99 |
| Blend 109 | Span 80 | 1338-43-8 | 0.1 | 4 |
| | Tween 80 | | 0.1 | 5 |
| | Isopar M | 64742-47-8 | 8 | 40 |
| | Water | 7732-18-5 | 35 | 99 |
| | Blend 8 | | 0.1 | 10 |
| | 2% Sodium Benzoate | | 6 | 35 |

TABLE 1-continued

BLENDS

| | Compounds | CAS Registry Number | low % | high % |
|---|---|---|---|---|
| Blend 110 | D-Limonene | 5989-27-5 | 0.1 | 5 |
| | Thyme Oil White | 8007-46-3 | 0.1 | 2 |
| | Wintergreen Oil | 68917-75-9 | 0.1 | 3 |
| | Span 80 | 1338-43-8 | 0.1 | 4 |
| | Tween 80 | | 0.1 | 5 |
| | Sodium Benzoate | 532-32-1 | 0.08 | 0.6 |
| | Isopar M | 64742-47-8 | 8 | 40 |
| | Water | 7732-18-5 | 40 | 99 |
| Blend 111 | Propellent A70 | | 10 | 65 |
| | Blend 109 | | 45 | 99 |
| Blend 112 | D-Limonene | 5989-27-5 | 0.1 | 5 |
| | Thyme Oil White | 8007-46-3 | 0.08 | 1 |
| | Wintergreen Oil | 68917-75-9 | 0.1 | 3 |
| | Span 80 | 1338-43-8 | 0.1 | 3 |
| | Tween 80 | | 0.1 | 5 |
| | Sodium Benzoate | 532-32-1 | 0.08 | 0.6 |
| | Isopar M | 64742-47-8 | 6 | 35 |
| | Water | 7732-18-5 | 35 | 99 |
| | Propellent A70 | | 10 | 65 |
| Blend 113 | Sodium Lauryl Sulfate | 151-21-3 | 5 | 30 |
| | Water | 7732-18-5 | 55 | 99 |
| Blend 114 | Sodium Lauryl Sulfate | 151-21-3 | 0.08 | 1 |
| | Xanthan Gum | 11138-66-2 | 0.06 | 0.3 |
| | Water | 7732-18-5 | 60 | 99.9 |
| Blend 115 | Citronella Oil | 106-22-9 | 0.08 | 0.6 |
| | Carbopol 940 | [9003-01-4] | 0.08 | 0.6 |
| | BHT (butylated hydroxytoluene) | 128-37-0 | 0.06 | 0.3 |
| | Water | 7732-18-5 | 30 | 99 |
| | Emulsifying Wax | 67762-27-0, 9005-67-8 | 8 | 40 |
| | Light Liquid Paraffin | 8012-95-1 | 0.1 | 10 |
| | White Soft Paraffin | [8009-03-8] | 0.1 | 25 |
| | Sodium Metabisulphate | [7681-57-4] | 0.08 | 1 |
| | Propylene Glycol | [57-55-6] | 0.1 | 6 |
| | Cresmer RH40 hydrogenated castor oil | [61791-12-6] | 0.1 | 15 |
| | Triethanolamine | [102-71-6] | 0.08 | 0.6 |
| | Vitamin E Acetate | [58-95-7] | 0.002 | 0.08 |
| | Disodium EDTA | [139-33-3] | 0.005 | 0.2 |
| | Blend 1 | | 0.1 | 15 |
| Blend 116 | Water | 7732-18-5 | 20 | 99 |
| | Blend 75 | | 35 | 99 |
| Blend 117 | D-Limonene | 5989-27-5 | 0.1 | 10 |
| | Thyme Oil White | 8007-46-3 | 0.1 | 15 |
| | Benzyl Alcohol | 100-51-6 | 8 | 50 |
| | Isopar M | 64742-47-8 | 10 | 65 |
| | Water | 7732-18-5 | 25 | 99 |
| | Bifenthrin | 83657-04-3 | 0.005 | 0.2 |
| | Blend 63 | | 0.1 | 15 |
| | Stock 10% SLS Solution | | 0.1 | 10 |
| Blend 118 | Thyme Oil White | 8007-46-3 | 0.1 | 2 |
| | Wintergreen Oil | 68917-75-9 | 0.1 | 3 |
| | Isopropyl myristate | 110-27-0 | 0.1 | 3 |
| | Sodium Lauryl Sulfate | 151-21-3 | 0.002 | 0.08 |
| | Water | 7732-18-5 | 60 | 99 |
| Blend 119 | Thyme Oil White | 8007-46-3 | 0.1 | 4 |
| | Wintergreen Oil | 68917-75-9 | 0.1 | 8 |
| | Isopropyl myristate | 110-27-0 | 0.1 | 5 |
| | AgSorb clay carrier | | 60 | 99 |
| Blend 120 | Thyme Oil White | 8007-46-3 | 0.1 | 4 |
| | Wintergreen Oil | 68917-75-9 | 0.1 | 8 |
| | Isopropyl myristate | 110-27-0 | 0.1 | 5 |
| | DC Lite | | 60 | 99 |
| Blend 121 | D-Limonene | 5989-27-5 | 15 | 75 |
| | Thyme Oil White | 8007-46-3 | 0.1 | 4 |
| | Linalool Coeur | 78-70-6 | 0.08 | 0.6 |
| | Tetrahydrolinalool | 78-69-3 | 0.08 | 0.6 |
| | Vanillin | 121-33-5 | 0.002 | 0.08 |
| | Isopropyl myristate | 110-27-0 | 0.08 | 0.6 |
| | Piperonal (aldehyde) [Heliotropine] | 120-57-0 | 0.08 | 0.6 |
| | Blend 66 | | 0.1 | 10 |
| | Geraniol 60 | 106-24-1 | 0.06 | 0.3 |
| | Triethyl Citrate | 77-93-0 | 0.08 | 0.6 |
| | Water | 7732-18-5 | 35 | 99 |
| | Stock 10% SLS Solution | | 0.1 | 10 |

TABLE 1-continued

BLENDS

| | Compounds | CAS Registry Number | low % | high % |
|---|---|---|---|---|
| Blend 122 | Miracle Gro (Sterile) | | 60 | 99 |
| | Blend 11 | | 0.1 | 15 |
| Blend 123 | Thyme Oil White | 8007-46-3 | 15 | 75 |
| | Amyl Butyrate | 540-18-1 | 15 | 75 |
| | Anise Star Oil | | 30 | 99 |
| | Genistein | | 0.001 | 0.1 |
| Blend 124 | Linalool Coeur | | 0.1 | 20 |
| | Tetrahydrolinalool | | 0.1 | 25 |
| | Vanillin | | 0.1 | 2 |
| | Isopropyl myristate | | 0.1 | 30 |
| | Piperonal (aldehyde) [Heliotropine] | | 0.1 | 30 |
| | Geraniol Fine FCC | | 0.1 | 15 |
| | Triethyl Citrate | | 0.1 | 30 |
| | Thyme Oil White | | 30 | 99 |
| Blend 125 | D-Limonene | 5989-27-5 | 5 | 30 |
| | Linalool Coeur | 78-70-6 | 8 | 40 |
| | Tetrahydrolinalool | 78-69-3 | 15 | 75 |
| | Vanillin | 121-33-5 | 0.1 | 8 |
| | Isopropyl myristate | 110-27-0 | 15 | 85 |
| | Piperonal (aldehyde) | 120-57-0 | 5 | 30 |
| | Geraniol 60 | | 5 | 30 |
| Blend 126 | D-Limonene | 5989-27-5 | 45 | 99 |
| | Thyme Oil White | 8007-46-3 | 0.1 | 10 |
| | Linalool Coeur | 78-70-6 | 0.1 | 2 |
| | Tetrahydrolinalool | 78-69-3 | 0.1 | 3 |
| | Vanillin | 121-33-5 | 0.005 | 0.2 |
| | Isopropyl myristate | 110-27-0 | 0.1 | 3 |
| | Piperonal (aldehyde) [Heliotropine] | 120-57-0 | 0.1 | 3 |
| | Blend 66 | | 5 | 30 |
| | Geraniol 60 | | 0.1 | 2 |
| | Triethyl Citrate | 77-93-0 | 0.1 | 3 |

The foregoing Table 1 provides exemplary combinations of ingredients for useful blends in accordance with the invention. In many cases a particular ingredient is listed very specifically such as, for example, with reference to a CAS number and/or particular modifiers of the basic name of the ingredient. Such specific listings are non-limiting examples of types of ingredients, and similar ingredients (such as, for example, with different CAS numbers and/or variant forms of the type of ingredient) can be substituted within the scope of certain embodiments of the invention.

The foregoing Table 1 also provides an exemplary range of amounts of each ingredient expressed as a weight/weight percentage of the listed blend. The exemplary range for each ingredient in each blend is provided as a number in the fourth column indicating a value at the low end of such exemplary range, and in the fifth column indicating a value at the high end of such exemplary range. The provided ranges are exemplary; other useful ranges exist and are expressly within the scope of certain embodiments on the invention. Namely, other high and low amounts defining other useful ranges and/or amounts of the listed ingredients, can include 1%, 2%, 5%, 10%, 15%, 20%, 25%, 40%, 50%, 60%, 75%, 85%, 95%, 110%, 125%, 150%, 175%, 200%, 250%, 300%, 400%, 500%, 750%, 900%, or 1000% of the amount listed as the low amount and/or the high amount, with the caveat that the relative percentage of any given ingredient cannot exceed 99.99% of the total blend of ingredients.

Furthermore, other blends useful in accordance with the present invention are shown in the following table.

TABLE 2

| Ingredients | Exemplified form | % Range 1 | | % Range 2 | | % Range 3 | | % Range 4 | | Exemplified % (w/w) |
|---|---|---|---|---|---|---|---|---|---|---|
| Example 1 - Ingredient Family 1 | | | | | | | | | | |
| Linalool | Linalool Coeur | 0.66% | 19.80% | 3.30% | 9.90% | 4.95% | 8.25% | 5.94% | 7.26% | 6.60% |
| Base Oil | Soy Bean Oil | 2.40% | 72.00% | 12.00% | 36.00% | 18.00% | 30.00% | 21.60% | 26.40% | 24.00% |
| Thymol | Thymol (crystal) | 3.72% | 99.00% | 18.60% | 55.80% | 27.90% | 46.50% | 33.48% | 40.92% | 37.20% |
| Pinene | Alpha-Pinene, 98% | 0.38% | 11.40% | 1.90% | 5.70% | 2.85% | 4.75% | 3.42% | 4.18% | 3.80% |
| Cymene | Para-Cymene | 2.84% | 85.17% | 14.20% | 42.59% | 21.29% | 35.49% | 25.55% | 31.23% | 28.39% |
| Example 2 - Ingredient Family 2 | | | | | | | | | | |
| Thyme Oil | Thyme Oil White | 2.06% | 61.80% | 10.30% | 30.90% | 15.45% | 25.75% | 18.54% | 22.66% | 20.60% |
| Wintergreen Oil | Wintergreen Oil | 4.51% | 99.00% | 22.55% | 67.65% | 33.83% | 56.38% | 40.59% | 49.61% | 45.10% |
| Isopropyl myristate | Isopropyl myristate | 3.43% | 99.00% | 17.15% | 51.45% | 25.73% | 42.88% | 30.87% | 37.73% | 34.30% |

TABLE 2-continued

| Ingredients | Exemplified form | % Range 1 | | % Range 2 | | % Range 3 | | % Range 4 | | Exemplified % (w/w) |
|---|---|---|---|---|---|---|---|---|---|---|
| | | | | Example 3 - Ingredient Family 3 | | | | | | |
| Thyme Oil | Thyme Oil White | 2.48% | 74.25% | 12.38% | 37.13% | 18.56% | 30.94% | 22.28% | 27.23% | 24.75% |
| Amyl Butyrate | Amyl Butyrate | 2.30% | 69.12% | 11.52% | 34.56% | 17.28% | 28.80% | 20.74% | 25.34% | 23.04% |
| Anise Star Oil | Anise Star Oil | 5.22% | 99.00% | 26.11% | 78.32% | 39.16% | 65.26% | 46.99% | 57.43% | 52.21% |
| | | | | Example 4 - Ingredient Family 4 | | | | | | |
| Thyme Oil | Thyme Oil White | 2.48% | 74.25% | 12.38% | 37.13% | 18.56% | 30.94% | 22.28% | 27.23% | 24.75% |
| Amyl Butyrate | Amyl Butyrate | 2.30% | 69.12% | 11.52% | 34.56% | 17.28% | 28.80% | 20.74% | 25.34% | 23.04% |
| Anise Star Oil | Anise Star Oil | 5.22% | 99.00% | 26.10% | 78.30% | 39.15% | 65.25% | 46.98% | 57.42% | 52.20% |
| Isoflavone | Genistein | 0.001% | 5.00% | 0.005% | 0.02% | 0.008% | 0.012% | 0.009% | 0.011% | 0.01% |
| | | | | Example 5 - Ingredient Family 5 | | | | | | |
| Thyme Oil | Thyme Oil White | 2.05% | 61.50% | 10.25% | 30.75% | 15.38% | 25.63% | 18.45% | 22.55% | 20.50% |
| Wintergreen Oil | Wintergreen Oil | 4.50% | 99.00% | 22.50% | 67.50% | 33.75% | 56.25% | 40.50% | 49.50% | 45.00% |
| Vanillin | Vanillin | 0.11% | 5.00% | 0.55% | 1.65% | 0.83% | 1.38% | 0.99% | 1.21% | 1.10% |
| Isopropyl myristate | Isopropyl myristate | 3.34% | 99.00% | 16.70% | 50.10% | 25.05% | 41.75% | 30.06% | 36.74% | 33.40% |
| | | | | Example 6 - Ingredient Family 6 | | | | | | |
| Limonene | D-Limonene | 5.63% | 99.00% | 28.15% | 84.45% | 42.23% | 70.38% | 50.67% | 61.93% | 56.30% |
| Thyme Oil | Thyme Oil White | 1.24% | 37.14% | 6.19% | 18.57% | 9.29% | 15.48% | 11.14% | 13.62% | 12.38% |
| Wintergreen Oil | Wintergreen Oil | 3.13% | 93.96% | 15.66% | 46.98% | 23.49% | 39.15% | 28.19% | 34.45% | 31.32% |
| | | | | Example 7 - Ingredient Family 7 | | | | | | |
| Potassium Sorbate | Potassium Sorbate | 0.10% | 5.00% | 0.50% | 1.50% | 0.75% | 1.25% | 0.90% | 1.10% | 1.00% |
| Xanthan Gum | Xanthan Gum | 0.03% | 0.14% | 0.14% | 0.42% | 0.21% | 0.35% | 0.25% | 0.31% | 0.28% |
| Water | Water | 8.18% | 99.00% | 40.91% | 99.00% | 61.37% | 99.00% | 73.64% | 90.00% | 81.82% |
| Blend 74 | Blend 74 | 1.69% | 50.7% | 8.45% | 25.35% | 12.68% | 21.13% | 15.21% | 18.59% | 16.90% |
| | | | | Example 8 - Ingredient Family 8 | | | | | | |
| Isopropyl myristate | Isopropyl myristate | 4.84% | 99.00% | 24.18% | 72.53% | 36.26% | 60.44% | 43.52% | 53.19% | 48.35% |
| Geraniol | Geraniol Fine FCC | 1.50% | 44.94% | 7.49% | 22.47% | 11.24% | 18.73% | 13.48% | 16.48% | 14.98% |
| Thyme Oil | Thyme Oil White | 3.67% | 99.00% | 18.34% | 55.01% | 27.50% | 45.84% | 33.00% | 40.34% | 36.67% |
| | | | | Example 9 - Ingredient Family 9 | | | | | | |
| Limonene | D-Limonene | 0.99% | 29.70% | 4.95% | 14.85% | 7.43% | 12.38% | 8.91% | 10.89% | 9.90% |
| Linalool | Linalool Coeur | 1.41% | 42.42% | 7.07% | 21.21% | 10.61% | 17.68% | 12.73% | 15.55% | 14.14% |
| Tetrahydrolinalool | Tetrahydrolinalool | 2.43% | 72.87% | 12.15% | 36.44% | 18.22% | 30.36% | 21.86% | 26.72% | 24.29% |
| Vanillin | Vanillin | 0.25% | 7.44% | 1.24% | 3.72% | 1.86% | 3.10% | 2.23% | 2.73% | 2.48% |
| Isopropyl myristate | Isopropyl myristate | 2.89% | 86.76% | 14.46% | 43.38% | 21.69% | 36.15% | 26.03% | 31.81% | 28.92% |
| Piperonal | Piperonal (aldehyde) | 1.00% | 29.91% | 4.99% | 14.96% | 7.48% | 12.46% | 8.97% | 10.97% | 9.97% |
| Geraniol | Geraniol Fine FCC | 1.03% | 30.90% | 5.15% | 15.45% | 7.73% | 12.88% | 9.27% | 11.33% | 10.30% |
| | | | | Example 10 - Ingredient Family 10 | | | | | | |
| Limonene | D-Limonene | 2.85% | 85.38% | 14.23% | 42.69% | 21.35% | 35.58% | 25.61% | 31.31% | 28.46% |
| Thyme Oil | Thyme Oil White | 3.13% | 93.87% | 15.65% | 46.94% | 23.47% | 39.11% | 28.16% | 34.42% | 31.29% |
| Blend 63 | Blend 63 | 4.03% | 99.00% | 20.13% | 60.38% | 30.19% | 50.31% | 36.23% | 44.28% | 40.25% |
| | | | | Example 11 - Ingredient Family 11 | | | | | | |
| Limonene | D-Limonene | 0.96% | 28.89% | 4.82% | 14.45% | 7.22% | 12.04% | 8.67% | 10.59% | 9.63% |
| BSO | BSO | 2.67% | 79.98% | 13.33% | 39.99% | 20.00% | 33.33% | 23.99% | 29.33% | 26.66% |
| Linalool | Linalool Coeur | 0.98% | 29.46% | 4.91% | 14.73% | 7.37% | 12.28% | 8.84% | 10.80% | 9.82% |
| Tetrahydrolinalool | Tetrahydrolinalool | 1.18% | 35.43% | 5.91% | 17.72% | 8.86% | 14.76% | 10.63% | 12.99% | 11.81% |
| Vanillin | Vanillin | 0.12% | 5.00% | 0.60% | 1.80% | 0.90% | 1.50% | 1.08% | 1.32% | 1.20% |
| Base oil | Mineral Oil White USP | 1.50% | 44.91% | 7.49% | 22.46% | 11.23% | 18.71% | 13.47% | 16.47% | 14.97% |
| Isopropyl myristate | Isopropyl myristate | 1.45% | 43.62% | 7.27% | 21.81% | 10.91% | 18.18% | 13.09% | 15.99% | 14.54% |
| Piperonal | Piperonal (aldehyde) | 0.49% | 14.55% | 2.43% | 7.28% | 3.64% | 6.06% | 4.37% | 5.34% | 4.85% |
| Geraniol | Geraniol Fine FCC | 0.65% | 19.53% | 3.26% | 9.77% | 4.88% | 8.14% | 5.86% | 7.16% | 6.51% |
| | | | | Example 12 - Ingredient Family 12 | | | | | | |
| Thyme Oil | Thyme Oil White | 4.19% | 99.00% | 20.93% | 62.79% | 31.40% | 52.33% | 37.67% | 46.05% | 41.86% |
| Isopropyl myristate | Isopropyl myristate | 3.83% | 99.00% | 19.17% | 57.51% | 28.76% | 47.93% | 34.51% | 42.17% | 38.34% |
| Geraniol | Geraniol Fine FCC | 1.98% | 59.40% | 9.90% | 29.70% | 14.85% | 24.75% | 17.82% | 21.78% | 19.80% |
| | | | | Example 13 - Ingredient Family 13 | | | | | | |
| Linalool | Linalool Coeur | 2.34% | 70.14% | 11.69% | 35.07% | 17.54% | 29.23% | 21.04% | 25.72% | 23.38% |
| Amyl Butyrate | Amyl Butyrate | 2.35% | 70.38% | 11.73% | 35.19% | 17.60% | 29.33% | 21.11% | 25.81% | 23.46% |
| Anise Star Oil | Anise Star Oil | 5.32% | 99.00% | 26.58% | 79.74% | 39.87% | 66.45% | 47.84% | 58.48% | 53.16% |
| | | | | Example 14 - Ingredient Family 14 | | | | | | |
| Linalool | Linalool Coeur | 3.74% | 99.00% | 18.72% | 56.16% | 28.08% | 46.80% | 33.70% | 41.18% | 37.44% |
| Thymol | Thymol | 3.67% | 99.00% | 18.36% | 55.08% | 27.54% | 45.90% | 33.05% | 40.39% | 36.72% |
| Pinene | Alpha-pinene, 98% | 0.47% | 13.98% | 2.33% | 6.99% | 3.50% | 5.83% | 4.19% | 5.13% | 4.66% |
| Cymene | Para-Cymene | 0.19% | 5.61% | 0.94% | 2.81% | 1.40% | 2.34% | 1.68% | 2.06% | 1.87% |
| Anethole | Trans-Anethole | 1.93% | 57.93% | 9.66% | 28.97% | 14.48% | 24.14% | 17.38% | 21.24% | 19.31% |

TABLE 2-continued

| Ingredients | Exemplified form | % Range 1 | | % Range 2 | | % Range 3 | | % Range 4 | | Exemplified % (w/w) |
|---|---|---|---|---|---|---|---|---|---|---|
| Example 15 - Ingredient Family 15 | | | | | | | | | | |
| Limonene | D-Limonene | 2.74% | 82.05% | 13.68% | 41.03% | 20.51% | 34.19% | 24.62% | 30.09% | 27.35% |
| Thyme Oil | Thyme Oil White | 3.01% | 90.24% | 15.04% | 45.12% | 22.56% | 37.60% | 27.07% | 33.09% | 30.08% |
| Lilac Flower Oil | Lilac Flower Oil | 4.26% | 99.00% | 21.30% | 63.90% | 31.95% | 53.25% | 38.34% | 46.86% | 42.57% |
| Example 16 - Ingredient Family 16 | | | | | | | | | | |
| Thyme Oil | Thyme Oil White | 3.82% | 99.00% | 19.11% | 57.32% | 28.66% | 47.76% | 34.39% | 42.03% | 38.21% |
| Wintergreen Oil | Wintergreen Oil | 2.48% | 74.37% | 12.40% | 37.19% | 18.59% | 30.99% | 22.31% | 27.27% | 24.79% |
| Isopropyl Myristate | Isopropyl Myristate | 3.59% | 99.00% | 17.95% | 53.84% | 26.92% | 44.86% | 32.30% | 39.48% | 35.89% |
| vanillin | Vanillin | 0.11% | 5.00% | 0.56% | 1.67% | 0.83% | 1.39% | 1.00% | 1.22% | 1.11% |
| Example 17 - Ingredient Family 17 | | | | | | | | | | |
| Wintergreen Oil | Wintergreen Oil | 2.48% | 74.46% | 12.41% | 37.23% | 18.62% | 31.03% | 22.34% | 27.30% | 24.82% |
| Isopropyl Myristate | Isopropyl Myristate | 3.59% | 99.00% | 17.97% | 53.91% | 26.96% | 44.93% | 32.35% | 39.53% | 35.94% |
| Thyme Oil | Thyme Oil White | 3.92% | 99.00% | 19.62% | 58.86% | 29.43% | 49.05% | 35.32% | 43.16% | 39.24% |
| Example 18 - Ingredient Family 18 | | | | | | | | | | |
| Thyme Oil | Thyme Oil White | 0.46% | 13.8% | 2.30% | 6.90% | 3.45% | 5.75% | 4.14% | 5.06% | 4.60% |
| Wintergreen Oil | Wintergreen Oil | 5.78% | 99.00% | 28.90% | 86.70% | 43.35% | 72.25% | 52.02% | 63.58% | 57.80% |
| Isopropyl Myristate | Isopropyl Myristate | 3.76% | 99.00% | 18.80% | 56.40% | 28.20% | 47.00% | 33.84% | 41.36% | 37.60% |
| Example 19 - Ingredient Family 19 | | | | | | | | | | |
| Thyme Oil | Thyme Oil White | 3.16% | 94.71% | 15.79% | 47.36% | 23.68% | 39.46% | 28.41% | 34.73% | 31.57% |
| Isopropyl myristate | Isopropyl myristate | 3.86% | 99.00% | 19.28% | 57.84% | 28.92% | 48.20% | 34.70% | 42.42% | 38.56% |
| Wintergreen Oil | Wintergreen Oil | 2.99% | 89.61% | 14.94% | 44.81% | 22.40% | 37.34% | 26.88% | 32.86% | 29.87% |
| Example 20 - Ingredient Family 20 | | | | | | | | | | |
| Thyme Oil | Thyme Oil White | 2.06% | 61.80% | 10.30% | 30.90% | 15.45% | 25.75% | 18.54% | 22.66% | 20.60% |
| Isopropyl myristate | Isopropyl myristate | 3.43% | 99.00% | 17.15% | 51.45% | 25.73% | 42.88% | 30.87% | 37.73% | 34.30% |
| Geraniol | Geraniol Fine FCC | 4.51% | 99.00% | 22.55% | 67.65% | 33.83% | 56.38% | 40.59% | 49.61% | 45.10% |
| Example 21 - Ingredient Family 21 | | | | | | | | | | |
| Thyme Oil | Thyme Oil White | 1.24% | 37.14% | 6.19% | 18.57% | 9.29% | 15.48% | 11.14% | 13.62% | 12.38% |
| Wintergreen Oil | Wintergreen Oil | 3.13% | 93.96% | 15.66% | 46.98% | 23.49% | 39.15% | 28.19% | 34.45% | 31.32% |
| Limonene | D-Limonene | 5.63% | 99.00% | 28.15% | 84.45% | 42.23% | 70.38% | 50.67% | 61.93% | 56.30% |
| Example 22 - Ingredient Family 22 | | | | | | | | | | |
| LFO | LFO | 5.01% | 99.00% | 25.07% | 75.20% | 37.60% | 62.66% | 45.12% | 55.14% | 50.13% |
| BSO (Black Seed Oil) | BSO | 4.99% | 99.00% | 24.94% | 74.81% | 37.40% | 62.34% | 44.88% | 54.86% | 49.87% |
| Example 23 - Ingredient Family 23 | | | | | | | | | | |
| LFO | LFO | 8.01% | 99.00% | 40.05% | 99.00% | 60.07% | 99.00% | 72.08% | 88.10% | 80.09% |
| BSO (Black Seed Oil) | BSO | 1.99% | 59.73% | 9.96% | 29.87% | 14.93% | 24.89% | 17.92% | 21.90% | 19.91% |
| Example 24 - Ingredient Family 24 | | | | | | | | | | |
| Thyme Oil | Thyme Oil White, 1% Thyme Oil Red | 2.06% | 61.80% | 10.30% | 30.90% | 15.45% | 25.75% | 18.54% | 22.66% | 20.60% |
| Wintergreen Oil | Wintergreen Oil | 4.51% | 99.00% | 22.55% | 67.65% | 33.83% | 56.38% | 40.59% | 49.61% | 45.10% |
| Isopropyl myristate | Isopropyl myristate | 3.43% | 99.00% | 17.15% | 51.45% | 25.73% | 42.88% | 30.87% | 37.73% | 34.30% |
| Example 25 - Ingredient Family 25 | | | | | | | | | | |
| Thyme Oil | Thyme Oil White, 1% Thyme Oil Red | 3.00 | 90.00% | 5.00% | 70.00% | 10.00% | 50.00% | 15.00% | 40.00% | 31.41% |
| Isopropyl myristate | Isopropyl myristate | 3.00 | 90.00% | 5.00% | 70.00% | 10.00% | 50.00% | 15.00% | 40.00% | 38.65% |
| Geraniol | Geraniol Fine FCC | 3.00 | 90.00% | 5.00% | 70.00% | 10.00% | 50.00% | 15.00% | 40.00% | 29.94% |
| Example 26 - Ingredient Family 26 | | | | | | | | | | |
| Geraniol | Geraniol Fine FCC | 0.5% | 30.00% | 1.00% | 20.00% | 1.5% | 15.00% | 2.00% | 10.00% | 4.68% |
| Thyme Oil | Thyme Oil White | 3.00 | 90.00% | 5.00% | 80.00% | 10.00% | 70.00% | 15.00% | 60.00% | 50.76% |
| Linalool | Linalool Coeur | 0.5% | 30.00% | 1.00% | 20.00% | 1.5% | 15.00% | 2.00% | 10.00% | 6.42% |
| Tetrahydrolinalool | Tetrahydrolinalool | 0.5% | 30.00% | 1.00% | 20.00% | 1.5% | 15.00% | 2.00% | 10.00% | 8.82% |
| Vanillin | Vanillin | 0.05% | 20.00% | 0.10% | 15.00% | 0.2% | 10.00% | 0.30% | 5.00% | 0.53% |
| Isopropyl myristate | Isopropyl myristate | 0.5% | 30.00% | 1.00% | 20.00% | 1.5% | 15.00% | 2.00% | 10.00% | 9.06% |
| Piperonal | Piperonal (aldehyde) | 0.5% | 30.00% | 1.00% | 20.00% | 1.5% | 15.00% | 2.00% | 12.00% | 10.65% |
| Triethyl citrate | Triethyl citrate | 0.5% | 30.00% | 1.00% | 20.00% | 1.5% | 15.00% | 2.00% | 10.00% | 9.08% |
| Example 27 - Ingredient Family 27 | | | | | | | | | | |
| Wintergreen Oil | Wintergreen Oil | 3.00 | 90.00% | 5.00% | 80.00% | 10.00% | 70.00% | 15.00% | 60.00% | 44.66% |
| Thyme Oil | Thyme oil white | 1.99 | 59.73% | 9.96% | 29.87% | 14.93% | 24.89% | 17.92% | 21.90% | 20.39% |
| Mineral Oil | White Mineral Oil | 3.00 | 90.00% | 5.00% | 70.00% | 10.00% | 50.00% | 15.00% | 40.00% | 34.95% |
| Example 28 - Ingredient Family 28 | | | | | | | | | | |
| Geraniol | Geraniol 60 | 3.00 | 90.00% | 5.00% | 70.00% | 10.00% | 50.00% | 15.00% | 40.00% | 19.6% |
| Thyme Oil | Thyme Oil White | 3.00 | 90.00% | 5.00% | 70.00% | 10.00% | 60.00% | 15.00% | 50.00% | 41.4% |

TABLE 2-continued

| Ingredients | Exemplified form | % Range 1 | | % Range 2 | | % Range 3 | | % Range 4 | | Exemplified % (w/w) |
|---|---|---|---|---|---|---|---|---|---|---|
| Isopropyl myristate | Isopropyl myristate | 0.5% | 20.00% | 1.00% | 15.00% | 1.5% | 10.00% | 2.00% | 5.00% | 3.8% |
| Mineral Oil | White Mineral Oil | 3.00 | 90.00% | 5.00% | 70.00% | 10.00% | 50.00% | 15.00% | 40.00% | 35.2% |
| | | | | Example 29 - Ingredient Family 29 | | | | | | |
| Geraniol | Geraniol 60 | 3.00 | 90.00% | 5.00% | 70.00% | 10.00% | 50.00% | 15.00% | 40.00% | 16.54% |
| Thyme Oil | Thyme Oil White | 3.00 | 90.00% | 5.00% | 80.00% | 10.00% | 70.00% | 15.00% | 60.00% | 47.85% |
| Linalool | Linalool Coeur | 0.10% | 20.00% | 0.50% | 15.00% | 1.00% | 10.00% | 1.50% | 5.00% | 1.85% |
| Vanillin | Vanillin | 0.5% | 20.00% | 1.00% | 15.00% | 1.5% | 10.00% | 2.00% | 5.00% | 3.76% |
| Isopropyl myristate | Isopropyl myristate | 3.00 | 90.00% | 5.00% | 70.00% | 10.00% | 50.00% | 15.00% | 40.00% | 16.00% |
| Triethyl citrate | Triethyl citrate | 3.00 | 90.00% | 5.00% | 70.00% | 10.00% | 50.00% | 12.00% | 40.00% | 14.00% |
| | | | | Example 30 - Ingredient Family 30 | | | | | | |
| Geraniol | Geraniol 60 | 3.00 | 90.00% | 5.00% | 70.00% | 10.00% | 50.00% | 15.00% | 40.00% | 32.82% |
| Vanillin | Vanillin | 0.5% | 30.00% | 1.00% | 20.00% | 1.5% | 15.00% | 2.00% | 10.00% | 7.48% |
| Isopropyl myristate | Isopropyl myristate | 3.00 | 90.00% | 5.00% | 70.00% | 10.00% | 50.00% | 15.00% | 40.00% | 31.77% |
| Triethyl citrate | Triethyl citrate | 3.00 | 90.00% | 5.00% | 70.00% | 10.00% | 50.00% | 15.00% | 40.00% | 27.93% |
| | | | | Example 31 - Ingredient Family 31 | | | | | | |
| Geraniol | Geraniol 60 | 0.5% | 20.00% | 1.00% | 15.00% | 1.5% | 10.00% | 2.00% | 5.00% | 3.83% |
| Thyme Oil | Thyme Oil White | 3.00 | 90.00% | 5.00% | 70.00% | 10.00% | 50.00% | 15.00% | 40.00% | 33.50% |
| Thymol ester | Thymyl acetate | 0.5% | 20.00% | 1.00% | 15.00% | 1.5% | 10.00% | 2.00% | 5.00% | 4.33% |
| Linalool ester | Linalyl acetate | 0.5% | 30.00% | 1.00% | 20.00% | 1.5% | 15.00% | 2.00% | 10.00% | 8.05% |
| Tetrahydrolinalool | Tetrahydrolinalool | 0.5% | 30.00% | 1.00% | 20.00% | 1.5% | 15.00% | 2.00% | 10.00% | 7.22% |
| Vanillin | Vanillin | 0.05% | 20.00% | 0.10% | 15.00% | 0.2% | 10.00% | 0.30% | 5.00% | 0.44% |
| Isopropyl myristate | Isopropyl myristate | 0.5% | 30.00% | 1.00% | 20.00% | 1.5% | 15.00% | 2.00% | 10.00% | 7.41% |
| Piperonal | Piperonal (aldehyde) | 0.5% | 30.00% | 1.00% | 20.00% | 1.5% | 15.00% | 2.00% | 10.00% | 8.72% |
| Triethyl citrate | Triethyl citrate | 0.5% | 30.00% | 1.00% | 20.00% | 1.5% | 15.00% | 2.00% | 10.00% | 7.43% |
| Mineral Oil | White Mineral Oil | 3.00 | 90.00% | 5.00% | 70.00% | 10.00% | 50.00% | 15.00% | 40.00% | 19.07% |

Additionally, as readily apparent to one of skill in the art, various formulations of emulsions and methods of preparing emulsions are known to one of skill in the art and the invention is in no way limited to the specific formulations described herein. As used herein and apparent to one of skill in the art, microemulsion formulations are encompassed by the term "emulsions." Although in no way so limited, ingredients described in Environmental Protection Agency 40 C.F.R. § 180.950, as well as those described in Federal Insecticide, Fungicide and Rodenticide Act (FIFRA)'s § 25(b) Food-Use listing and § 25(b) Non-Food listing for pesticide products (See Table 3 (a) and (b) below), are hereby submitted as possible examples of ingredients and formulating compounds that may also be used to formulate emulsions in conjunction with the various embodiments described herein.

TABLE 3

(a) FIFRA § 25(b) Food-Use listing:

| CAS Reg. No. | Chemical Name |
|---|---|
| N/A | Apple pomace |
| 12174-11-7 | Attapulgite-type clay |
| 8012-89-3 | Beeswax |
| 1302-78-9 | Bentonite |
| 121-33-5 | Benzaldehyde, 4-hydroxy-3-methoxy- |
| 532-32-1 | Benzoic acid, sodium salt |
| N/A | Calcareous shale |
| 13397-26-7 | Calcite (Ca(Co3)) |
| 471-34-1 | Calcium carbonate |
| 124-38-9 | Carbon dioxide |
| 298-14-6 | Carbonic acid, monopotassium salt |
| 8015-86-9 | Carnauba wax |
| 9000-07-1 | Carrageenan |
| 479-61-8 | Chlorophyll a |
| 519-62-0 | Chlorophyll b |
| N/A | Citrus meal |
| 68514-76-1 | Citrus pulp |
| 8002-31-1 | Cocoa |
| N/A | Cocoa shells |
| 8001-69-2 | Cod-liver oil |
| N/A | Corn cobs |
| 26402-22-2 | Decanoic acid, monoester with 1,2,3-propanetriol |
| 142-18-7 | Dodecanoic acid, 2,3-dihydroxypropyl ester |
| 27638-00-2 | Dodecanoic acid, diester with 1,2,3-propanetriol |
| 27215-38-9 | Dodecanoic acid, monoester with 1,2,3-propanetriol |
| 16389-88-1 | Dolomite |
| N/A | Douglas fir bark |
| 9000-70-8 | Gelatins |
| 56-81-5 | Glycerin |
| 1323-83-7 | Glyceryl distearate |
| N/A | Granite |
| N/A | Grape pumice |
| 9000-01-5 | Gum arabic |
| 9000-65-1 | Gum tragacanth |
| 13397-24-5 | Gypsum (Ca(SO4)•2H2O) |
| 57-10-3 | Hexadecanoic acid |
| 26657-95-4 | Hexadecanoic acid, diester with 1,2,3-propanetriol |
| 26657-96-5 | Hexadecanoic acid, monoester with 1,2,3-propanetriol |
| 68514-28-3 | Humic acids, potassium salts |
| 68131-04-4 | Humic acids, sodium salt |
| 8016-70-4 | Hydrogenated soybean oil |
| 110-27-0 | Isopropyl myristate |
| 1309-37-1 | Iron oxide (Fe2O3) |
| 1332-58-7 | Kaolin |
| 63-42-3 | Lactose |
| 143-07-7 | Lauric acid |
| 1309-48-4 | Magnesium oxide |
| 12207-97-5 | Magnesium oxide silicate (Mg3O(Si2O5)2), monohydrate |
| 1343-90-4 | Magnesium silicate hydrate |
| 7487-88-9 | Magnesium sulfate |
| 10034-99-8 | Magnesium sulfate heptahydrate |
| 12003-38-2 | Mica |
| 8012-95-1 | Mineral Oil (U.S.P.) |
| 1318-93-0 | Montmorillonite |
| 544-63-8 | Myristic acid |
| 57-11-4 | Octadecanoic acid |

TABLE 3-continued

(a) FIFRA § 25(b) Food-Use listing:

| CAS Reg. No. | Chemical Name |
|---|---|
| 123-95-5 | Octadecanoic acid, butyl ester |
| 11099-07-3 | Octadecanoic acid, ester with 1,2,3-propanetriol |
| 557-04-0 | Octadecanoic acid, magnesium salt |
| 31566-31-1 | Octadecanoic acid, monoester with 1,2,3-propanetriol |
| 822-16-2 | Octadecanoic acid, sodium salt |
| 557-05-1 | Octadecanoic acid, zinc salt |
| 36354-80-0 | Octanoic acid, diester with 1,2,3-propanetriol |
| 26402-26-6 | Octanoic acid, monoester with 1,2,3-propanetriol |
| 112-80-1 | Oleic acid |
| 8002-75-3 | Palm oil |
| 9002-88-4 | Polyethylene |
| 7778-80-5 | Potassium sulfate |
| 7631-86-9 | Silica (crystalline free) |
| 13776-74-4 | Silicic acid (H2SiO3), magnesium salt (1:1) |
| 1344-00-9 | Silicic acid, aluminum sodium salt |
| 1344-95-2 | Silicic acid, calcium salt |
| 144-55-8 | Sodium bicarbonate |
| 7757-82-6 | Sodium sulfate |
| 50-70-4 | Sorbitol |
| 589-68-4 | Tetradecanoic acid, 2,3-dihydroxypropyl ester |
| 53563-63-6 | Tetradecanoic acid, diester with 1,2,3-propanetriol |
| 27214-38-6 | Tetradecanoic acid, monoester with 1,2,3-propanetriol |
| 57-13-6 | Urea |
| 8028-52-2 | Vinegar (maximum 8% acetic acid in solution |
| 8042-47-5 | White mineral oil (petroleum) |
| 1314-13-2 | Zinc Oxide (ZnO) |

(b) FIFRA § 25(b) Non-Food listing:

| CAS Reg. No. | Chemical Name |
|---|---|
| 5743-26-0 | Acetic acid, calcium salt, monohydrate |
| 9002-18-0 | Agar |
| N/A | Almond hulls |
| N/A | Almond shells |
| 1327-36-2 | Aluminate silicate |
| 1335-30-4 | Aluminum silicate |
| 137-66-6 | Ascorbyl palmitate |
| 85049-30-5 | Bentonite, sodian |
| 1863-63-4 | Benzoic acid, ammonium salt |
| 2090-05-3 | Benzoic acid, calcium salt |
| 582-25-2 | Benzoic acid, potassium salt |
| 68409-75-6 | Bone meal |
| N/A | Bran |
| N/A | Bread crumbs |
| 123-95-5 | Butyl stearate |
| 62-54-4 | Calcium acetate |
| 2090-05-3 | Calcium benzoate |
| 6107-56-8 | Calcium octanoate |
| 12168-85-3 | Calcium oxide silicate (Ca3O(SiO4)) |
| 7778-18-9 | Calcium sulfate |
| 10101-41-4 | Calcium sulfate dihydrate |
| 10034-76-1 | Calcium sulfate hemihydrate |
| N/A | Canary seed |
| 7440-44-0 | Carbon |
| 546-93-0 | Carbonic acid, magnesium salt (1:1) |
| N/A | Cardboard |
| 9000-71-9 | Caseins |
| N/A | Cat food |
| 9000-11-7 | Cellulose, carboxymethyl ether |
| N/A | Cheese |
| 9000-69-5 | Citrus pectin |
| N/A | Clam shells |
| N/A | Cocoa shell flour |
| N/A | Cookies |
| 61789-98-8 | Cork |
| N/A | Cotton |
| 68424-10-2 | Cottonseed meal |
| N/A | Cracked wheat |
| 53998-07-1 | Decanoic acid, diester with 1,2,3-propanetriol |
| 7727-73-3 | Disodium sulfate decahydrate |
| N/A | Egg Shells |
| N/A | Egg |
| 68476-25-5 | Feldspar |
| N/A | Fish meal |
| 8016-13-5 | Fish oil (not conforming to 40 CFR 180.950) |
| 8031-18-3 | Fuller's earth |
| 68476-37-9 | Glue (as depolymd. animal collagen) |
| 7782-42-5 | Graphite |
| 1317-60-8 | Hematite (Fe2O3) |
| 68334-00-9 | Hydrogenated cottonseed oil |
| 84681-71-0 | Hydrogenated rapeseed oil |
| 12068-86-9 | Iron magnesium oxide (Fe2MgO4) |
| 12259-21-1 | Iron oxide (Fe2O3), hydrate |
| 1317-61-9 | Iron oxide (Fe3O4) |
| 1345-25-1 | Iron oxide (FeO) |
| 61790-53-2 | Kieselguhr (less than 1% crstalline silica) (Diatomaceous earth) |
| 64044-51-5 | Lactose, monohydrate |
| N/A | Latex |
| 12001-27-3 | Lime (chemical) dolominic |
| 1317-65-3 | Limestone |
| 8001-26-1 | Linseed oil |
| 553-70-8 | Magnesium benzoate |
| 1343-88-0 | Magnesium silicate |
| 14987-04-3 | Magnesium silicon oxide (Mg2Si3O8) |
| 6915-15-7 | Malic acid |
| 8002-48-0 | Malt extract |
| N/A | Malt flavor |
| 12001-26-2 | Mica-group minerals |
| 8049-98-7 | Milk |
| N/A | Millet seed |
| 37244-96-5 | Nepheline syenite |
| 7727-37-9 | Nitrogen |
| N/A | Nutria meat |
| N/A | Nylon |
| 1002-89-7 | Octadecanoid acid, ammonium salt |
| 1592-23-0 | Octadecanoid acid, calcium salt |
| 593-29-3 | Octadecanoid acid, potassium salt |
| 764-71-6 | Octanoic acid, potassium salt |
| 1984-06-1 | Octanoic acid, sodium salt |
| 12694-22-3 | 9-Octadecanoic acid, monoester with oxybis (propanediol) |
| 25637-84-7 | 9-Octadecanoic acid (9Z)-, diester with 1,2,3-propanetriol |
| 25496-72-4 | 9-Octadecanoic acid (9Z)-, monoester with 1,2,3-propanetriol |
| 71012-10-7 | 9-Octadecanoic acid (9Z)-, monoester with tetra-glycerol |
| 143-18-0 | 9-Octadecanoic acid (9Z)-, potassium salt |
| 111-03-5 | 9-Octadecanoic acid (Z)-, 2,3-dihydroxypropyl ester |
| 7492-30-0 | 9-Octadecanoic acid, 12-hydroxy-, monopotassium salt, (9Z, 12R)- |
| 5323-95-5 | 9-Octadecanoic acid, 12-hydroxy-, monosodium salt, (9Z, 12R)- |
| 49553-76-6 | 9-Octadecanoic acid, ester with 1,2,3-propanetriol |
| 8007-69-0 | Oils, almond |
| 68917-73-7 | Oils, wheat |
| N/A | Oyster shells |
| 68514-74-9 | Palm oil, hydrogenated |
| 8002-74-2 | Paraffin wax |
| N/A | Peanut butter |
| N/A | Peanut shells |
| N/A | Peanuts |
| N/A | Peat moss |
| 9000-69-5 | Pectin |
| 130885-09-5 | Perlite |
| 93763-70-3 | Perlite, expanded |
| 26499-65-0 | Plaster of paris |
| 9007-48-1 | Polyglyceryl oleate |
| 9009-32-9 | Polyglyceryl stearate |
| 1327-44-2 | Potassium aluminum silicate, anhydrous |
| 1332-09-8 | Pumice |
| N/A | Red cedar chips |
| N/A | Red dog flour |
| 9006-04-6 | Rubber |
| N/A | Sawdust |

-continued (b) FIFRA § 25(b) Non-Food listing:

| CAS Reg. No. | Chemical Name |
|---|---|
| N/A | Shale |
| 12003-51-9 | Silicic acid (H4SiO4), aluminum sodium salt (1:1:1) |
| 1327-43-1 | Silicic acid, aluminum magnesium salt |
| 12736-96-8 | Silicic acid, aluminum potassium sodium salt |
| 308076-02-0 | Soapstone |
| 127-09-3 | Sodium acetate |
| 143-19-1 | Sodium oleate |
| 24634-61-5 | Sorbic acid, potassium salt |
| N/A | Soy protein |
| N/A | Soybean hulls |
| 68308-36-1 | Soybean meal |
| 68513-95-1 | Soybean, flour |
| 7704-34-9 | Sulfur |
| 7646-93-7 | Sulfuric acid, monopotassium salt |
| 13429-27-1 | Tetradecanoic acid, potassium salt |
| 1318-00-9 | Vermiculite |
| 50-81-7 | Vitamin C |
| 1406-18-4 | Vitamin E |
| N/A | Walnut flour |
| N/A | Walnut shells |
| N/A | Wheat |
| N/A | Wheat flour |
| 8006-95-9 | Wheat germ oil |
| 92129-90-3 | Whey |
| 68917-75-9 | Wintergreen oil |
| 13983-17-0 | Wollastonite (Ca(SiO3)) |
| N/A | Wool |
| 68876-77-7 | Yeast |
| 1318-02-1 | Zeolites [excluding erionite (CAS Reg. No. 66733-21-9)] |
| 68989-22-0 | Zeolites, NaA |
| 12063-19-3 | Zinc iron oxide |

Example 1

Ingredient Family 24 in SLS/XG and in the Castor Oil/Tween EC

Administering 15% of a blend containing the ingredients in the exemplified form of Ingredient Family 24 (See Table 2: specifically, 34.29% Isopropyl myristate, 45.11% Wintergreen oil, 20.59% of a mixture of 99% Thyme Oil White and 1% thyme oil red, with ingredient expressed as a weight/weight percentage) in an SLS/Xanthan gum formulation (0.15% SLS, 1% xanthan gum, 83.85% water, with ingredient expressed as a weight/weight percentage) at 60 seconds, 100 seconds, and 300 seconds, resulted in 1.33, 5.0, and 8.0, respectively, average knockdown of German Cockroach. (See FIG. 1 herein). This may be compared to results of administering ME-1, used as a reference microemulsion formulation (see FIG. 1 herein), which at 60 seconds, 100 seconds, and 300 seconds, resulted in 0, 0, and 0.67, respectively, average knockdown of German Cockroach. Similarly, administering 15% Blend 35 SLS/Xanthan gum formulation at 60 seconds, 100 seconds, and 300 seconds, resulted in 1.0, 4.33 and 8.0, respectively, average kills of German Cockroach. (See FIG. 2 herein). This may be compared to results of administering ME-1 which at 60 seconds, 100 seconds, and 300 seconds, resulted in 0, 0, 0.33, respectively, average kills of German Cockroach.

With reference to FIG. 1 herein, administering 15% Blend 35 Ethoxylated Castor oil/Tween 80 formulation (0.83% Ethoxylated Castor oil, 0.83% Tween 80, 83.3% water, with ingredient expressed as weight/weight percentage) at 60 seconds, 100 seconds, and 300 seconds, resulted in 2.33, 5.33, and 7.33, respectively, average knockdown of German Cockroach. This may be compared to results of administering ME-1, which at 60 seconds, 100 seconds, and 300 seconds, resulted in 0, 0, and 0.67, respectively, average knockdown of German Cockroach. Similarly, with reference to FIG. 2 herein, administering 15% Blend 35 Ethoxylated Castor oil/Tween 80 formulation at 60 seconds, 100 seconds, and 300 seconds, resulted in 1.67, 4.67 and 7.0, respectively, average kills of German Cockroach. This may be compared to results of administering ME-1, which at 60 seconds, 100 seconds, and 300 seconds, resulted in 0, 0, 0.33, respectively, average kills of German Cockroach.

The above referenced formulations were administered as part of a trigger spray assay with ten (10) roaches per replicate, with three (3) replicates.

Example 2

Microemulsion Formulations Improve Activity

With respect to FIG. 1, administering ME-2 resulted in 3, 8.33 and 10 average knockdown of German Cockroach, at 60 seconds, 100 seconds, and 300 seconds, respectively. Similarly, administration of ME-3 resulted in 6.33, 9 and 10 average knockdown of German Cockroach, at 60 seconds, 100 seconds, and 300 seconds, respectively, and ME-4 resulting in 8.33, 10 and 10 average knockdown of German Cockroach, at 60 seconds, 100 seconds, and 300 seconds, respectively.

Figure 2:
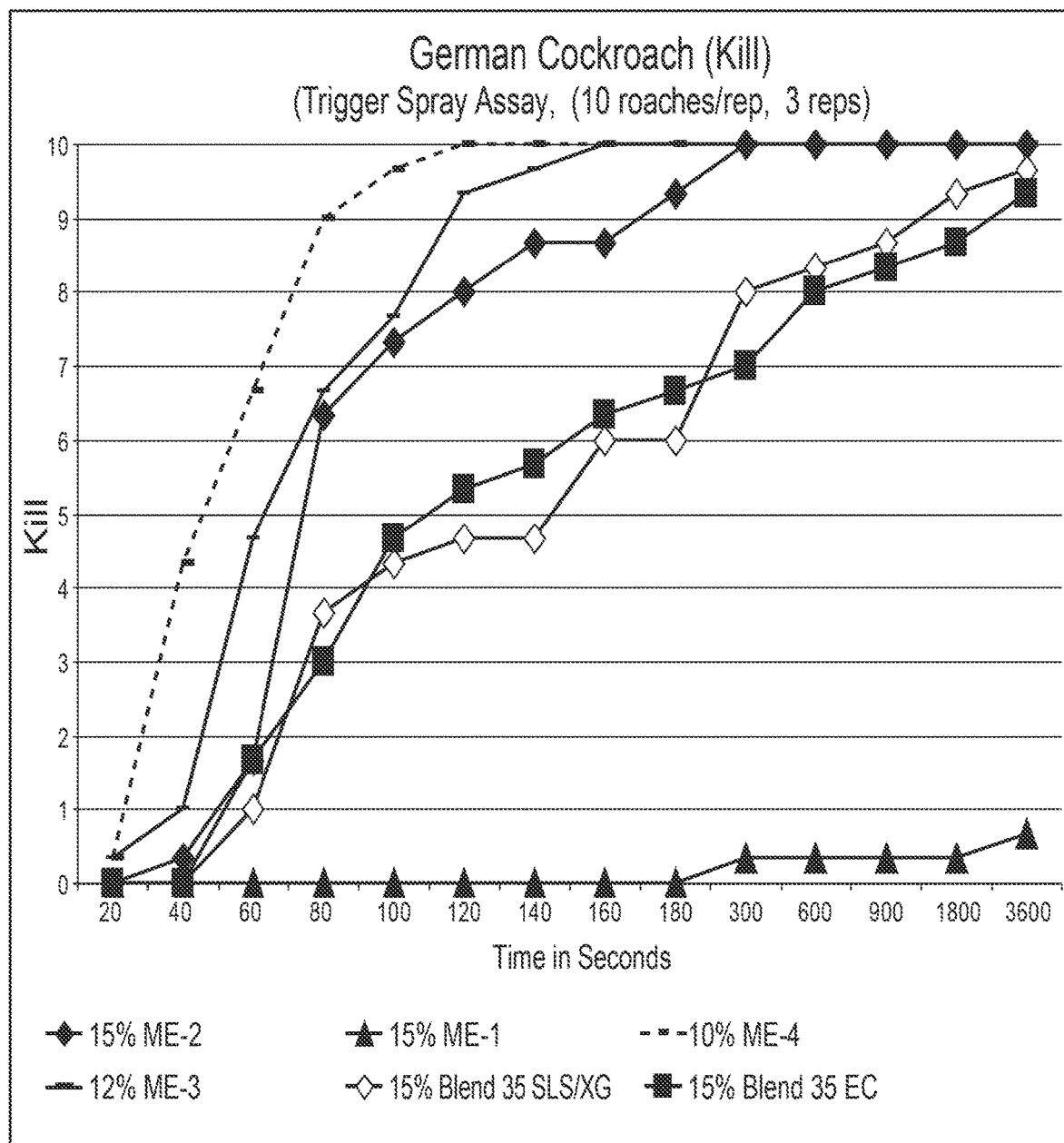
FIG. 2 depicts, in accordance with an embodiment described herein, a chart of percent killed versus time by formulations of a blend containing the ingredients in the exemplified form of Ingredient Family 24 applied to the German cockroach.

With respect to FIG. 2, administering ME-2 resulted in 1.67, 7.33 and 10 average kills of German Cockroach, at 60 seconds, 100 seconds, and 300 seconds, respectively. Similarly, administration of ME-3 resulted in 4.67, 7.67 and 10 average kills of German Cockroach, at 60 seconds, 100 seconds, and 300 seconds, respectively, and ME-4 resulting in 6.67, 9.67 and 10 average kills of German Cockroach, at 60 seconds, 100 seconds, and 300 seconds, respectively.

The above referenced formulations were administered as part of a trigger spray assay with ten (10) roaches per replicate, with three (3) replicates.

Example 3

Ingredient Family 24 in SLS/XG

Blend 38 (Table 1 herein) can be combined with an SLS/Xanthan gum formulation (0.15% SLS, 1% xanthan gum, 83.85% water, with ingredient expressed as a weight/weight percentage). Administration of this combined formulation can result in an improved activity of pesticidal blends, such as an increase in average knockdown and kills of pests as compared to the efficacy of the blend or independent ingredients alone.

Example 4

Ingredient Family 25 in Castor Oil/Tween EC

A blend containing the ingredients in the exemplified form of Ingredient Family 25 (Table 2 herein) can be combined with an Ethoxylated Castor oil/Tween 80 formulation (0.83% Ethoxylated Castor oil, 0.83% Tween 80, 83.3% water, with ingredient expressed as weight/weight percentage). Administration of this combined formulation can result in an improved activity of pesticidal blends, such as an increase in average knockdown and kills of pests as compared to the efficacy of the blend or independent ingredients alone.

Example 5

Ingredient Family 24 in SLS/XG

A blend containing the ingredients in the exemplified form of Ingredient Family 24 (Table 2 herein) can be combined with an SLS/Xanthan gum formulation (0.15% SLS, 1% xanthan gum, 83.85% water, with ingredient expressed as a weight/weight percentage). Administration of this combined formulation can result in an improved activity of pesticidal blends, such as an increase in average knockdown and kills of pests as compared to the efficacy of the blend or independent ingredients alone.

Example 6

Ingredient Family 24 in Castor Oil/Tween EC

A blend containing the ingredients in the exemplified form of Ingredient Family 24 (Table 2 herein) can be combined with an Ethoxylated Castor oil/Tween 80 formulation (0.83% Ethoxylated Castor oil, 0.83% Tween 80, 83.3% water, with ingredient expressed as weight/weight percentage). Administration of this combined formulation can result in an improved activity of pesticidal blends, such as an increase in average knockdown and kills of pests as compared to the efficacy of the blend or independent ingredients alone.

Example 7

Ingredient Family 24 in Dust Formulation

A blend containing the ingredients in the exemplified form of Ingredient Family 24 (Table 2 herein) can be combined with a dust formulation (20% of the blend, 20% Microcel E, 20% calcium carbonate, and 40% sodium bicarbonate). Administration of this combined formulation can result in an improved activity of pesticidal blends, such as an increase in average knockdown and kills of pests as compared to the efficacy of the blend or independent ingredients alone.

Example 8

Ingredient Family 30 in Dust Formulation

A blend containing the ingredients in the exemplified form of Ingredient Family 30 (Table 2 herein) can be combined with a dust formulation (20% of the blend, 20% Microcel E, 20% calcium carbonate, and 40% sodium bicarbonate). Administration of this combined formulation can result in an improved activity of pesticidal blends, such as an increase in average knockdown and kills of pests as compared to the efficacy of the blend or independent ingredients alone.

Example 9

Ingredient Family 30 in Dust Formulation

A blend containing the ingredients in the exemplified form of Ingredient Family 30 (Table 2 herein) can be combined with a dust formulation (20% of the blend, 20% Microcel E, 20% calcium carbonate, and 40% sodium bicarbonate) combined with oil at specific ratio). Administration of this combined formulation can result in an improved activity of pesticidal blends, such as an increase in average knockdown and kills of pests as compared to the efficacy of the blend or independent ingredients alone.

Example 10

Ingredient Family 24, 25, or 30 in TGO/Lecithin

Blends containing any of containing the ingredients in the exemplified form of Ingredient Families 24, 15, or 30 (Table 2 herein) can be combined with an TGO/lecithin formulation (15% of the blend, with 0.15% polyglycerol oleate, 0.03% soy lecithin, 0.11% potassium sorbate, 0.225% xanthan gum, 2.5% isopropyl alcohol, and 82% water, with each ingredient expressed as a weight/weight percentage). Administration of this combined formulation can result in an improved activity of pesticidal blends, such as an increase in average knockdown and kills of pests as compared to the efficacy of the blend or independent ingredients alone.

Example 11

Generally

Formulated Sprayable Product: Active Ingredient ((a) Ingredient Family 24, (b) Ingredient Family 25, and/or (c) Ingredient Family 30))+Inert Ingredient ((a) SLS/Xanthan Gum, (b) dust formulation and/or (c) EC formulation)).

One of ordinary skill in the art will recognize that modifications and variations are possible without departing from the teachings of the invention. This description, and particularly the specific details of the exemplary embodiments disclosed, is provided primarily for clearness of understanding and no unnecessary limitations are to be understood therefrom, for modifications and other embodiments will become evident to those skilled in the art upon reading this disclosure and can be made without departing from the spirit or scope of the claimed invention.

What is claimed is:

1. A method for controlling pests comprising administering a dust composition to at least one of a host and an area in which the host will be located, wherein the dust composition consists of, in weight percentages based on total weight of the composition:
   2% to 10% geraniol;
   optionally, thyme oil;
   calcium carbonate;
   sodium bicarbonate; and
   calcium silicate.

2. The method for controlling pests of claim 1, provided that a weight percentage concentration of geraniol in the dust composition is 3% to 8%.

3. The method for controlling pests of claim 1, provided that a weight percentage concentration of geraniol in the dust composition is 2% to 6%.

4. The method for controlling pests of claim 1, provided that a weight percentage concentration of thyme oil in the dust composition is 2.06% to 6.18%.

5. The method for controlling pests of claim 1, provided that a weight percentage concentration of thyme oil in the dust composition is 3.09% to 5.15%.

6. The method for controlling pests of claim 1, wherein the pests comprise at least one organism selected from the group consisting of insects, mites, spiders, arachnids, arachnoids, cockroaches, larvae, and invertebrates.

7. The method for controlling pests of claim 1, wherein the pests comprise mites.

8. The method for controlling pests of claim 1, wherein:
the dust composition consists of 2% to 6% geraniol, 3.09% to 5.15% thyme oil, calcium carbonate, sodium bicarbonate, and calcium silicate; and
the pests comprise at least one organism selected from the group consisting of insects, mites, spiders, arachnids, arachnoids, cockroaches, larvae, and invertebrates.

9. The method for controlling pests of claim 1, provided that the dust composition consists of, in weight percentages based on total weight of the composition:
2% to 10% geraniol;
thyme oil;
calcium carbonate;
sodium bicarbonate; and
calcium silicate.

* * * * *